US012767861B2

(12) United States Patent
Suwa et al.

(10) Patent No.: US 12,767,861 B2
(45) Date of Patent: Oct. 20, 2026

(54) RELEASE LINER FOR SILICONE ADHESIVE LAYER, AND LAMINATE AND ROLL BODY INCLUDING THE RELEASE LINER

(71) Applicant: 3M INNOVATIVE PROPERTIES COMPANY, St. Paul, MN (US)

(72) Inventors: Toshihiro Suwa, Tokyo (JP); Katsumasa Nemoto, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 345 days.

(21) Appl. No.: 18/262,421

(22) PCT Filed: Jan. 26, 2022

(86) PCT No.: PCT/IB2022/050680
§ 371 (c)(1),
(2) Date: Jul. 21, 2023

(87) PCT Pub. No.: WO2022/162555
PCT Pub. Date: Aug. 4, 2022

(65) Prior Publication Data

US 2024/0092071 A1 Mar. 21, 2024

(30) Foreign Application Priority Data

Jan. 29, 2021 (JP) ................................ 2021-013590
Apr. 23, 2021 (JP) ................................ 2021-073647

(51) Int. Cl.
*C09J 7/40* (2018.01)
*B32B 7/12* (2006.01)
(Continued)

(52) U.S. Cl.
CPC ................. *C09J 7/401* (2018.01); *B32B 7/12* (2013.01); *B32B 27/08* (2013.01); *B32B 27/10* (2013.01);
(Continued)

(58) Field of Classification Search
CPC ..... C09J 7/401; C09J 7/405; C09J 7/38; C09J 2433/005; B32B 7/12; B32B 27/08;
(Continued)

(56) References Cited

U.S. PATENT DOCUMENTS 2,676,182 A 4/1954 Herbert et al.
3,627,851 A 12/1971 Brady
(Continued)

FOREIGN PATENT DOCUMENTS

JP 2001240775 A 9/2001
JP 2014148646 A 8/2014
(Continued)

OTHER PUBLICATIONS

LumirrorTM #75 Technical Data Sheet (Year: 2025).*
(Continued)

*Primary Examiner* — Blaine Copenheaver
(74) *Attorney, Agent, or Firm* — Ann K. Gallagher

(57) ABSTRACT

Object To provide a non-fluorine-based release liner having excellent heat-resistant stability of releasability and release strength that may be applied to a silicone adhesive layer, and a laminate and a roll body including the release liner. Resolution Means A release liner for a silicone adhesive layer according to an embodiment of the present disclosure includes a substrate and a release layer on at least one surface of the substrate, and the release layer contains poly(meth)acrylic acid ester, the poly(meth)acrylic acid ester is a polymer of a polymerizable component containing an alkyl (meth)acrylate monomer having a branched alkyl group having 8 or more carbon atoms.

10 Claims, 1 Drawing Sheet

(51) Int. Cl.

| | |
|---|---|
| ***B32B 27/08*** | (2006.01) |
| ***B32B 27/10*** | (2006.01) |
| ***B32B 27/30*** | (2006.01) |
| ***B32B 27/36*** | (2006.01) |
| ***C08F 220/18*** | (2006.01) |
| ***C08J 7/04*** | (2020.01) |
| ***C09D 133/08*** | (2006.01) |
| ***C09J 7/38*** | (2018.01) |

(52) U.S. Cl.
CPC ............ *B32B 27/308* (2013.01); *B32B 27/36* (2013.01); *C08F 220/1818* (2020.02); *C08J 7/042* (2013.01); *C09D 133/08* (2013.01); *C09J 7/405* (2018.01); *B32B 2405/00* (2013.01); *C08J 2367/00* (2013.01); *C08J 2433/08* (2013.01); *C09J 7/38* (2018.01); *C09J 2433/005* (2013.01)

(58) Field of Classification Search
CPC ....... B32B 27/10; B32B 27/308; B32B 27/36; B32B 2405/00; C08F 220/1818; C08F 220/1808; C08F 220/302; C08F 222/102; C08F 220/1804; C08J 7/042; C08J 2367/00; C08J 2433/08; C09D 133/08
See application file for complete search history.

(56) References Cited

U.S. PATENT DOCUMENTS

| | | | |
|---|---|---|---|
| 3,772,247 | A | 11/1973 | Flannigan et al. |
| 3,890,269 | A | 6/1975 | Martin |
| 4,661,577 | A | 4/1987 | Jo et al. |
| 4,707,531 | A | 11/1987 | Shirahata |
| 4,774,310 | A | 9/1988 | Butler |
| 4,900,474 | A | 2/1990 | Terae et al. |
| 4,935,484 | A | 6/1990 | Wolfgruber et al. |
| 5,026,890 | A | 6/1991 | Webb et al. |
| 5,028,679 | A | 7/1991 | Terae et al. |
| 5,110,890 | A | 5/1992 | Butler |
| 5,118,775 | A | 6/1992 | Inomata et al. |
| 5,214,119 | A | 5/1993 | Leir et al. |
| 5,236,997 | A | 8/1993 | Fujiki |
| 5,248,739 | A | 9/1993 | Schmidt et al. |
| 5,262,558 | A | 11/1993 | Kobayashi et al. |
| 5,276,122 | A | 1/1994 | Aoki et al. |
| 5,302,685 | A | 4/1994 | Tsumura et al. |
| 5,319,040 | A | 6/1994 | Wengrovius et al. |
| 5,461,134 | A | 10/1995 | Leir et al. |
| 5,512,650 | A | 4/1996 | Leir et al. |
| 6,569,521 | B1 | 5/2003 | Sheridan et al. |
| 6,660,354 | B2 | 12/2003 | Suwa et al. |
| 7,816,477 | B2 | 10/2010 | Suwa |
| 8,137,807 | B2 | 3/2012 | Clapper et al. |
| 8,765,881 | B2 | 7/2014 | Hays et al. |
| 2003/0152768 | A1 | 8/2003 | Melancon et al. |
| 2005/0118352 | A1 | 6/2005 | Suwa |
| 2009/0000727 | A1 | 1/2009 | Kumar |
| 2009/0263606 | A1 | 10/2009 | Nonaka |
| 2011/0126968 | A1 | 6/2011 | Determan et al. |
| 2012/0219794 | A1 | 8/2012 | Seth et al. |
| 2018/0029329 | A1 | 2/2018 | Hirano et al. |
| 2018/0312729 | A1 | 11/2018 | Hirano et al. |

FOREIGN PATENT DOCUMENTS

| | | | |
|---|---|---|---|
| JP | 2015183041 | A | 10/2015 |
| JP | 2017165818 | A | 9/2017 |
| JP | 2019188639 | | 10/2019 |
| JP | 2019188639 | A | 10/2019 |
| JP | 6756432 | | 9/2020 |
| WO | 1995003354 | A1 | 2/1995 |
| WO | 1996017726 | A1 | 6/1996 |
| WO | 1996034028 | A1 | 10/1996 |
| WO | 1996034030 | A1 | 10/1996 |
| WO | 1996035458 | A2 | 11/1996 |
| WO | 1997040103 | A1 | 10/1997 |
| WO | 1998017726 | A1 | 4/1998 |
| WO | 2007145996 | A2 | 12/2007 |
| WO | 2009058466 | A1 | 5/2009 |
| WO | 2010121033 | A2 | 10/2010 |
| WO | 2018037991 | A1 | 3/2018 |
| WO | 2020189635 | A1 | 9/2020 |
| WO | 2022162550 | A1 | 8/2022 |
| WO | 2022224081 | A1 | 10/2022 |

OTHER PUBLICATIONS

JP2017165818 machine translation (Year: 2017).*
ISR_forPCT/2022/050680_4pgs_CaseNo. 83883.
Extended European Search Report for European Patent Application No. 2 274 5468.3, dated Dec. 17, 2024, 12 pp.

* cited by examiner

RELEASE LINER FOR SILICONE ADHESIVE LAYER, AND LAMINATE AND ROLL BODY INCLUDING THE RELEASE LINER

TECHNICAL FIELD

The present disclosure relates to a release liner for a silicone adhesive layer, and a laminate and a roll body including the release liner.

BACKGROUND

In recent years, a release liner that may be applied to an adhesive layer has been developed.

Patent Document 1 (JP 2015-183041 A) discloses a release film for a silicone adhesive containing a polyvinyl acetal resin and a polymer having a structural unit derived from a monomer having a fluoroalkyl group, wherein an atomic concentration of fluorine in the vicinity of a surface of one main surface is 1.5 to 50 at %, and a difference between the atomic concentration of fluorine in the vicinity of the surface of one main surface and the atomic concentration of fluorine in the vicinity of the surface of the other main surface is 0.5 at % or greater.

Patent Document 2 (JP 2001-240775 A) discloses a release agent article being further subjected to radiation irradiation with respect to a release agent precursor obtained by polymerizing a polymerizable composition for forming a release agent that includes a substrate and a release agent provided on the substrate, wherein the release agent contains first alkyl (meth)acrylate having an alkyl group having 12 to 30 carbon atoms, second alkyl (meth)acrylate having an alkyl group having 1 to 12 carbon atoms, and a polymerization initiator of the first alkyl (meth)acrylate and the second alkyl (meth)acrylate, and discloses that an acrylic adhesive sheet is attached to the release sheet which is the release agent article.

CITATION LIST

Patent Literature

Patent Document 1: JP 2015-183041 A
Patent Document 2: JP 2001-240775 A

SUMMARY

Technical Problem

A silicone adhesive is generally excellent in heat resistance, electrical insulating properties, chemical resistance, and the like, and can be used in a wide range of temperature. When the silicone adhesive is applied to a release liner, a fluorine-based release liner is generally used as disclosed in Patent Document 1.

Although the fluorine-based release liner has excellent releasability to the silicone adhesive, it is expensive compared to other release liners. Furthermore, the use of a fluorine-based material tends to be restricted or suppressed from the perspective of preventing contamination of the fluorine component. Furthermore, a release liner used for a single-sided tape, a double-sided tape, and an adhesive transfer tape containing a silicone adhesive may be required heat-resistant stability of release strength in addition to releasability.

[Problem] The disclosure provides a non-fluorine-based and non-silicone-based release liner having excellent heat-resistant stability of releasability and release strength that may be applied to a silicone adhesive layer, and a laminate and a roll body including the release liner.

Solution to Problem

According to an embodiment of the present disclosure, there is provided a release liner for a silicone adhesive layer including a substrate and a release layer on at least one surface of the substrate, and the release layer contains poly(meth)acrylic acid ester, the poly(meth)acrylic acid ester is a polymer of a polymerizable component containing an alkyl (meth)acrylate monomer having a branched alkyl group having 8 or more carbon atoms.

According to another embodiment of the present disclosure, there is provided a laminate including the release liner and a silicone adhesive layer disposed on the release layer of the release liner.

According to another embodiment of the present disclosure, there is provided a laminate including, in this order, the release liner, a silicone adhesive layer, and a second release liner.

According to another embodiment of the present disclosure, there is provided a roll body including the release liner including a release layer on both sides, and a silicone adhesive layer.

Advantageous Effects of Invention

According to the present disclosure, it is possible to provide a non-fluorine-based and non-silicone-based release liner having excellent heat-resistant stability of releasability and release strength that may be applied to a silicone adhesive layer, and a laminate and a roll body including the release liner.

The above description will not be construed to mean that all embodiments of the present invention and all advantages of the present invention are disclosed.

DETAILED DESCRIPTION

Hereinafter, for the purpose of illustrating representative embodiments of the present invention, the present invention will be described in more detail with reference to the drawings as necessary, but the present invention is not limited to these embodiments.

In the present disclosure "non-fluorine-based and non-silicone-based" is meant to be non-fluorinated and non-silicone based. That is, the material to be used is not a fluorochemical material and is not a silicone-based material.

In the present disclosure "heat-resistant stability" refers to heat-resistant release stability, for example, even when the release liner is applied to the silicone adhesive and then heated or stored at a high temperature, the release strength of the release layer to silicone adhesive keeps stable.

In the present disclosure, "(meth)acryl" means acryl or methacryl, "(meth)acrylate" means acrylate or methacrylate, and "(meth)acryloyl" means "acryloyl" or "methacryloyl."

In the present disclosure, "polymerizable component" refers to a component capable of radical polymerizable, such as a (meth)acrylate monomer having a branched alkyl group having 8 or more carbon atoms.

As used herein, "curing" may also include the concepts commonly referred to as "crosslinking."

In the present disclosure, for example, "on" in "the release layer disposed on the substrate" means that the release layer is directly disposed on the substrate, or that the release layer is indirectly disposed above the substrate with another layer interposed therebetween.

In the present disclosure, for example, "order" of "including, in this order, the release liner, a silicone adhesive layer, and a second release liner" means that when attention is paid to three constituent members of the release liner, the silicone adhesive layer, and the second release liner, the laminate includes these constituent members in this order, and another layer such as a printing layer may be interposed between these constituent members, for example, between the silicone adhesive layer and the second release liner.

Figure 1:
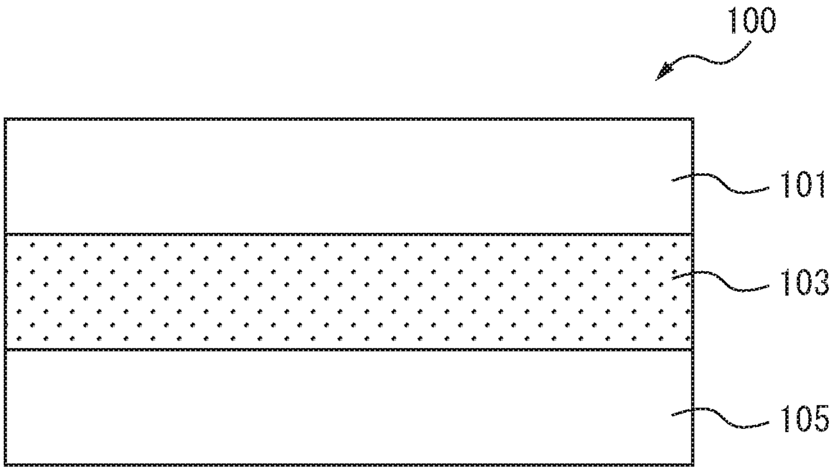
FIG. 1 is a schematic cross-sectional view of a laminate including a release liner and a silicone adhesive layer according to an embodiment of the present disclosure.

FIG. 1 is a schematic cross-sectional view of a laminate according to one embodiment of the present disclosure. A laminate 100 of FIG. 1 includes a release liner 101, a silicone adhesive layer 103, and a second release liner 105 in this order. Here, the release liner 101 may be referred to as a "first release liner" to distinguish it from the second release liner. The release liner 101 and the second release liner 105 may be the same as or different from each other. Although a laminate of the embodiment of FIG. 1 has been applied with a release liner on both sides of the silicone adhesive layer, in other embodiments, a release liner may be applied to only one side of the silicone adhesive layer.

The release liner for a silicone adhesive layer of the present disclosure includes a release layer on at least one surface of a substrate, and the release layer includes a polymer of a polymerizable component including an alkyl (meth)acrylate monomer having a branched alkyl group having 8 or more carbon atoms.

Such a release layer (may be referred to as a "bNSNF release layer") can suppress the cost as compared with a fluorine-based release layer. The bNSNF release layer can exhibit a releasing performance substantially equivalent to the fluorine-based release layer with respect to a silicone adhesive layer (simply referred to as "adhesive layer"), and a good releasing performance can be exhibited as compared with a typical silicone-based release layer. Furthermore, the bNSNF release layer can exhibit more excellent heat-resistant stability of the release strength as compared with the fluorine-based release layer.

As illustrated in FIG. 1, when the release liner is applied to both sides of the adhesive layer, the release layer in the two release liners may be the same as or different from each other. When the release layers are applied to both sides of the substrate of the release liner, the release layers may be the same as or different from each other. Here, when referring to the release layers being different from each other, for example, in the case of the configuration of FIG. 1, in addition to a configuration in which the release layer of the release liner 101 is a bNSNF release layer and the release layer of the second release liner 105 is different in the type of material of the release layer such as a fluorine-based release layer, a configuration in which both the release layers of the release liner 101 and the second release liner 105 are bNSNF release layers but the release strength of the adhesive layer with respect to the release layer of the release liner 101 and the release strength of the adhesive layer with respect to the release layer of the second release liner are different from each other is also included. In a configuration in which the release layer has two release liners as illustrated in FIG. 1, or in a configuration in which the release layer is applied to both sides of the substrate of the release liner, if either one has the bNSNF release layer, the cost can be reduced as compared with the configuration in which both have the fluorine-based release layer. However, in consideration of prevention of contamination of the fluorine component and further cost reduction, it is preferable that all the release layers are bNSNF release layers in any configuration.

The release liner for a silicone adhesive layer of the present disclosure can also be used, for example, as a single-sided tape or a double-sided tape in addition to an aspect as an adhesive transfer tape as illustrated in FIG. 1. Here, in a case of the single-sided tape, typically, a release layer is provided on one side of the release liner substrate, and an adhesive is applied to a surface on a side where the release layer is not provided. Regarding the single-sided tape, there is also a wide mode in which a backing is provided on one side of the pressure sensitive adhesive layer, and a release liner is disposed on the opposite side of the adhesive layer (the release layer of the release liner is disposed in contact with the adhesive layer). In a case where a single-sided tape is subjected to machining or the like before applied to an adherend, the present aspect is typically used. Regarding the double-sided tape, an adhesive is applied on both sides of the backing, and a release liner is disposed on the surface of the adhesive applied on both sides of the backing (so that the release layer of the release liner is in contact with the adhesive layer).

The release layer of the release liner of the present disclosure includes a polymer of a polymerizable component including an alkyl (meth)acrylate monomer having a branched alkyl group having 8 or more carbon atoms (branched alkyl group). Such polymerizable components may be referred to as "polymerizable precursor composition" and a release agent containing such a polymer may be referred to as a "(meth)acrylic release agent".

In one embodiment, such polymers have a storage elastic modulus of about $1.0\times10^2$ to about $3.0\times10^6$ Pa at 20° C. and a frequency of 1 Hz.

The storage elastic modulus can be about $5.0\times10^2$ Pa or greater, about $1.0\times10^3$ Pa or greater, or about $1.5\times10^3$ Pa or greater, and can be about $3.0\times10^6$ Pa or less, about $1.0\times10^5$ Pa or less, or about $1.0\times10^4$ Pa or less.

Here, the storage elastic modulus (G') is a value measured in a shear mode at 20° C. and a frequency of 1 Hz using a viscoelastic device (for example, TA Instruments Japan Inc., rotary rheometer ARES-G2).

The number of carbon atoms of the branched alkyl group can be, for example, 10 or more, 14 or more, 18 or more, 20 or more, or 24 or more, and can be 36 or less, 34 or less, 32 or less, or 30 or less from the viewpoint of the releasability from the silicone adhesive layer and the like. The alkyl (meth)acrylate having a branched alkyl group having 8 or more carbon atoms can be used alone or in combination of two or more kinds thereof.

The branched alkyl group having 8 or more carbon atoms may be monobranched or polybranched, but is preferably monobranched from the viewpoint of the releasability.

The branching position of the branched alkyl group having 8 or more carbon atoms is preferably 2 or 4 from the viewpoint of the releasability.

Examples of the alkyl (meth)acrylate having a branched alkyl group having 8 or morecarbon atoms include 2-ethylhexyl (meth)acrylate (8 carbon atoms), isononyl (meth) acrylate (9 carbon atoms), 2-hexyldodecyl (meth)acrylate (18 carbon atoms), 2-heptylundecyl (meth)acrylate (18 carbon atoms), 2-octyldecyl (meth)acrylate (18 carbon atoms), isostearyl (meth)acrylate (18 carbon atoms), 2-decyltetradecyl (meth)acrylate (24 carbon atoms), 2-dodecylhexadecyl (meth)acrylate (28 carbon atoms), and 2-tetradecyloctadecyl (meth)acrylate (32 carbon atoms). Such alkyl (meth) acrylate having branched side chains can decrease the storage elastic modulus and the surface energy due to the decrease in crystallinity thereof. Among these, 2-hexyldodecyl (meth)acrylate, 2-octyldecyl (meth)acrylate, 2-decyltetradecyl (meth)acrylate, 2-dodecylhexadecyl (meth)acrylate, 2-tetradecyoctadecyl (meth)acrylate, and isostearyl (meth)acrylate are preferable. The poly(meth) acrylic acid ester prepared using these can suitably reduce the surface energy of the release layer.

The content of the alkyl (meth)acrylate monomer having a branched alkyl group having 8 or more carbon atoms in the polymerizable precursor composition can be about 40% by mass or greater, about 50% by mass or greater, about 60% by mass or greater, about 70% by mass or greater, about 80% by mass or greater, about 90% by mass or greater, about 95% by mass or greater, or about 99% by mass or greater with respect to the total amount of the alkyl (meth)acrylate monomer components. The upper limit of such a monomer content can be about 100% by mass or less, about 100% by mass, about 95% by mass or less, about 90% by mass or less, about 80% by mass or less, about 70% by mass or less, about 60% by mass or less, or about 50% by mass or less.

In one embodiment, a polymerizable component including alkyl (meth)acrylate having a branched alkyl group having 24 or more carbon atoms is polymerized.

A long-chain alkyl moiety of the branched alkyl group having 24 or more carbon atoms reduces the surface energy of a cured product of the (meth)acrylic release agent, and in addition, the alkyl group is branched, so that the crystallinity of the cured product is reduced and the storage elastic modulus of the cured product is reduced. As a result, it is possible to form a release layer exhibiting smooth (non-jerky) releasability at a wide release speed.

Examples of the alkyl (meth)acrylate monomer having a branched alkyl group having 24 or more carbon atoms include 2-decyltetradecyl (meth)acrylate (carbon atom number: 24), 2-dodecylhexadecyl (meth)acrylate (carbon atom number: 28), and 2-tetradecyloctadecyl (meth)acrylate (carbon atom number: 32). The alkyl (meth)acrylate monomer having a branched alkyl group having 24 or more carbon atoms can be used alone or in combination of two or more kinds thereof.

A branched alkyl group having 24 or more carbon atoms is preferably a single branched. As a result, the long-chain alkyl moiety of the branched alkyl group can be secured to form a release layer that exhibits suitable releasability with respect to the silicone adhesive layer.

The branching position of the branched alkyl group having 24 or more carbon atoms is preferably 2 or 4. As a result, the crystallinity of the cured product can be effectively reduced, and smoother releasability can be obtained.

The number of carbon atoms in the branched chains of branched alkyl group having 24 or more carbon atoms is preferably 8 or more, 10 or more, or 12 or more. As a result, a plurality of the long-chain alkyl moieties of the branched alkyl group can be secured to form a release layer that exhibits suitable releasability with respect to the silicone adhesive layer.

The content of the alkyl (meth)acrylate monomer having a branched alkyl group having 24 or more carbon atoms in the polymerizable precursor composition can be about 90% by mass or greater, about 95% by mass or greater, or about 99% by mass or greater with respect to the total amount of the alkyl (meth)acrylate monomer components. The upper limit of the monomer content can be about 100% by mass or less, or less than about 100% by mass.

In one embodiment, the polymerizable precursor composition contains an alkyl (meth)acrylate monomer having a linear alkyl group in addition to an alkyl (meth)acrylate monomer having a branched alkyl group having 8 or more carbon atoms from the viewpoint of adjusting the release strength. The alkyl (meth)acrylate monomer having a linear alkyl group can be used alone or in combination of two or more kinds thereof.

The number of carbon atoms of the linear alkyl group may be one or more, three or more, five or more, seven or more, ten or more, or 12 or more, and may be 24 or less, 20 or less, 18 or less, 16 or less, 14 or less, or 12 or less.

Examples of the alkyl (meth)acrylate having a linear alkyl group include butyl (meth)acrylate (4 carbon atoms), hexyl (meth)acrylate (6 carbon atoms), octyl (meth)acrylate (8 carbon atoms), decyl (meth)acrylate (10 carbon atoms), dodecyl (meth)acrylate (lauryl (meth)acrylate) (12 carbon atoms), tridecyl (meth)acrylate (13 carbon atoms), tetradecyl (meth)acrylate (14 carbon atoms), hexadecyl (meth) acrylate (cetyl (meth)acrylate) (16 carbon atoms), octadecyl (meth)acrylate (stearyl (meth)acrylate) (18 carbon atoms), and behenyl (meth)acrylate (22 carbon atoms).

The content of the alkyl (meth)acrylate having a linear alkyl group in the polymerizable precursor composition can be about 60% by mass or less, about 50% by mass or less, about 45% by mass or less, about 40% by mass or less, about 35% by mass or less, about 30% by mass or less, about 20% by mass or less, about 15% by mass or less, or about 10% by mass or less with respect to the total amount of the alkyl (meth)acrylate monomer components.

In one embodiment, the polymerizable precursor composition contains, in addition to the alkyl (meth)acrylate monomer having a branched alkyl group having 8 or more carbon atoms, a (meth)acrylate monomer having a radiation active group in a side chain Such monomers may be blended into the polymerizable precursor composition together with the monomer components described above to constitute a part of the polymer. The (meth)acrylate monomer having a radiation active group in a side chain can be used alone or in combination of two or more kinds thereof.

Examples of the (meth)acrylate monomer having a radiation active group in a side chain include a (meth)acrylate monomer having a benzophenone structure in the side chain and a (meth)acrylate monomer having an acetophenone structure in the side chain. The radiation active group (for example, a benzophenone structure and an acetophenone structure) generates radical by radiation irradiation such as electron beams, ultraviolet light, and the like. The generated radical facilitates crosslinking of the polymerization product of the polymerizable precursor composition and the bonding of the cured product and the substrate produced by cross-linking. As a result, the (meth)acrylic release agent can be efficiently cured with a low-irradiation amount of radiation, and the cohesive strength of the cured product and the adhesion of the cured product to the substrate are improved, and the transfer of the cured product to the silicone adhesive is suppressed. As a result of suppressing the transfer of the cured product to the silicone adhesive, the residual adhesion of the silicone adhesive can be maintained at a high level.

Examples of the (meth)acrylate monomer having a benzophenone structure in a side chain include 4-(meth)acryloyloxybenzophenone, 4-(meth)acryloyloxyethoxybenzophenone, 4-(meth)acryloyloxy-4'-methoxybenzophenone, 4-(meth)acryloyloxyethoxy-4'-methoxybenzophenone, 4-(meth)acryloyloxy-4'-bromobenzophenone, and 4-(meth) acryloyloxyethoxy-4'-bromobenzophenone.

Examples of the (meth)acrylate monomer having an acetophenone structure in a side chain include O-(meth) acryloyl acetophenoneoxime.

The content of the (meth)acrylate monomer having a radiation active group in a side chain in the polymerizable precursor composition is preferably about 1% by mass or less, about 0.8% by mass or less, or about 0.5% by mass or less with respect to the total amount of the alkyl (meth) acrylate monomer components. By setting the content of the (meth)acrylate monomer having a benzophenone structure in a side chain to about 1% by mass or less, an increase in a releasing force can be suppressed. The content of the (meth)acrylate monomer having a benzophenone structure in a side chain in the polymerizable precursor composition is preferably about 0.01% by mass or more, about 0.02% by mass or more, or about 0.05% by mass or more with respect to the total amount of the alkyl (meth)acrylate monomer components. When the content of the (meth)acrylate monomer having a radiation active group in the side chain is about 0.01% by mass or more, crosslinking of the polymer (polymerization product) and bonding of the cured product to the substrate can be effectively promoted.

In one embodiment, an alkyl (meth)acrylate monomer having a branched alkyl group having 8 or more carbon atoms and an alkyl (meth)acrylate monomer having a linear alkyl group do not have a polar functional group such as a carboxy group, a hydroxyl group, a nitrogen-containing group (for example, an amino group and an amide group), and a phosphorous-containing containing group on the alkyl group. In this embodiment, it is possible to maintain a suitable releasability even after the cured product has been exposed to high temperatures.

In one embodiment, the (meth)acrylic release agent contains a copolymer of an alkyl (meth)acrylate monomer having a branched alkyl group having 8 or more carbon atoms, an alkyl (meth)acrylate monomer having a linear alkyl group, and a (meth)acrylate monomer having a radiation active group in a side chain. Furthermore, for the release agent, it is possible to blend a copolymer of an alkyl (meth)acrylate monomer having a branched alkyl group having 8 or more carbon atoms and an alkyl (meth)acrylate monomer having a linear alkyl group, and a copolymer of an alkyl (meth)acrylate monomer having a branched alkyl group having 8 or more carbon atoms and a (meth)acrylate monomer having a radiation active group in a side chai.

The polymerizable precursor composition containing a polymerizable component such as the monomer is typically polymerized in the presence of a polymerization initiator. A polymerization mode may vary, and a solution polymerization performed by dissolving a polymerizable component in a solvent is preferable since a polymer of high molecular weight that is advantageous for coating formation is obtained. When the solution polymerization is used, a solution of a polymerization product can be used as a (meth) acrylic polymer release agent after the completion of polymerization.

Examples of the polymerization solvent include aliphatic hydrocarbons such as n-hexane and n-heptane, esters such as ethyl acetate and butyl acetate, ketones such as methyl ethyl ketone and methyl isobutyl ketone, and mixed solvents thereof. From the viewpoint of molecular weight control, a chain transfer agent or a chain extender can also be used.

Examples of the chain transfer agent include a thiol compound such as 2-mercaptoethanol, 3-mercapto-2-butanol, 3-mercapto-2-propanol, 3-mercapto-1-propanol, dodecanethiol, isooctyl thioglycolate, and 2-mercapto-ethylamine.

Examples of the chain extender include difunctional (meth)acrylic monomers such as 1,6-hexanediol di(meth) acrylate, 1,9-nonanediol di(meth)acrylate, polyethylene glycol di(meth)acrylate, and polypropylene glycol di(meth) acrylate.

The solution polymerization of the polymerizable precursor composition can be performed in an inert gas atmosphere such as nitrogen gas for about 2 hours to about 100 hours, usually at a reaction temperature of about 50° C. to about 100° C.

As the polymerization initiator, a general polymerization initiator can be used. Examples of the polymerization initiator include azo compounds such as 2,2'-azobisisobutyronitrile, 2,2'-azobis(2-methylbutyronitrile), 2,2-azobis(2,4-dimethylvaleronitrile), and 2,2'-azobis(2-methylpropionic acid) dimethyl ester (dimethyl 2,2'-azobis(2-methylpropionate)), and peroxides such as benzoyl peroxide and lauroyl peroxide.

The amount of the polymerization initiator used is preferably about 0.005 parts by mass or more and about 0.5 parts by mass or less based on 100 parts by mass of the alkyl (meth)acrylate monomer components. By setting the amount of polymerization initiator used to be about 0.005 parts by mass or more, the practical polymerization rate can be secured. By setting the amount of the polymerization initiator used to be about 0.5 parts by mass or less, the molecular weight of the polymer can be increased to a degree sufficient for coating formation.

The polymer contained in the (meth)acrylic release agent preferably has a weight average molecular weight of about 100000 or greater, about 300000 or greater, or about 500000 or greater, about 5000000 or less, about 4000000 or less, about 3000000 or less, about 2000000 or less, about 1500000 or less, or about 1000000 or less from the viewpoint of the releasing force and the handleability of the polymerization reaction. Here, in the present disclosure, the "weight average molecular weight" is a weight average molecular weight in terms of polystyrene standard by the gel permeation chromatography (GPC) method.

The substrate is not particularly limited, and for example, a plastic film such as polyester (for example, polyethylene terephthalate, polyethylene naphthalate, or polybutylene terephthalate), polyolefin (for example, polyethylene), polyimide (for example, Kapton (trade name) available from DU PONT-TORAY CO., LTD.), paper (for example, kraft paper), or a paper substrate coated with such a plastic material can be used. A colored film may be also used as an example of the substrate. The colored film may be a mixture of dyes in the plastic, a colored paper, or a transparent film coated with colored ink. For example, an example using a white film as a colored film will be described later. By using a colored film, it becomes easier for the user to recognize the release sheet. Further, a logo, instructions on how to use, or the like may be printed on the film. By using a colored film, it becomes easier for the user to see these printed characters and the like.

The thickness of the substrate is not particularly limited, and can be, for example, about 10 micrometers or greater, about 15 micrometers or greater, or about 20 micrometers or greater, and can be about 300 micrometers or less, about 200 micrometers or less, or about 150 micrometers or less.

The coating amount of the release agent described above can be varied depending on the substrate. For example, the release agent is typically applied such that the dry thickness is about 0.01 micrometers or greater and about 10 micrometers or less. In a case of the paper substrate in which the substrate is coated with a plastic film or plastic material such as polyester and polyolefin, the dry thickness is generally about 0.05 micrometers or greater, about 1 micrometer or less, and in a case of less absorbent or less smooth substrates, the dry thickness is generally about 0.1 micrometers or greater and about 5 micrometers or less.

In one embodiment, the release liner is formed by coating the release agent described above on at least one surface of the substrate and performing a drying process, curing treatment by heating, curing treatment by radiation (for example, electron beam and ultraviolet light), and the like.

The release liner can be produced, for example, by the following procedure. The (meth)acrylic release agent is diluted with an aliphatic hydrocarbon such as n-hexane or n-heptane, an aromatic hydrocarbon such as toluene or xylene, ester such as ethyl acetate or butyl acetate, ketone such as methyl ethyl ketone or methyl isobutyl ketone, halogenated hydrocarbon such as methylene chloride, or a mixed solvent thereof as necessary, then applied onto a substrate with a predetermined thickness using a bar coater, a roll coater, a spray, or the like, and dried by heating as necessary to form a release precursor layer on the substrate. A dilution solvent may be the same as or different from the solvent when the solution polymerization is performed.

Thereafter, the release precursor layer is irradiated with radiation such as electron beam and ultraviolet light to form a release layer on the substrate. The release layer is adhered to the substrate by radiation irradiation. In this way, a release liner can be obtained. For example, in a case of the electron beam irradiation, the absorption dose depends on the thickness and composition of the release precursor layer, but is usually about 1 kGy to about 100 kGy. In a case of the ultraviolet irradiation, the ultraviolet irradiation energy depends on the thickness and composition of the release precursor layer, but is usually about 10 $mJ/cm^2$ to about 3000 $mJ/cm^2$, and preferably about 20 $mJ/cm^2$ to about 500 $mJ/cm^2$. Since the ultraviolet irradiation does not require a large-scale apparatus unlike the electron beam irradiation, a release liner can be manufactured at low cost and with high productivity.

The release liner of the present disclosure includes the release layer described above, and thus can exhibit a suitable releasing performance for the silicone adhesive layer.

The silicone adhesive contained in the silicone adhesive layer that can be disposed on the release layer of the release liner is not particularly limited, and examples thereof include adhesives containing polyorganosiloxane, polydimethylsiloxane, polydiphenylsiloxane, polydimethyldiphenylsiloxane, or the like as a main component. These silicone adhesives may be used alone or in combination of two or more kinds thereof.

The silicone adhesive may be either a curable type or a non-curable type. Specifically, such a silicone adhesive may include, for example, peroxide-curable silicone, addition-reactive silicone, electron-beam or gamma-curable silicone, and modified silicone.

The peroxide-curable silicone may be used to increase cohesive strength by curing (crosslinking) reactions that are the catalyst. The addition-reactive curable silicone may be used to increase the cohesive strength by a hydrosilylation cross-linking reaction using a metal catalyst. A commercially available product can be used for the peroxide-curable silicone adhesive and the addition-reactive silicone adhesive. Examples of the commercially available peroxide-curable silicone adhesive include DOWSIL (trade name) SH 4280 available from Dow Toray Co., Ltd., KR-12 available from Shin-Etsu Chemical Co., Ltd., and the like. Examples of the commercially available addition-reactive silicone adhesive include DOWSIL (trade name) SD 4570 available from Dow Toray Co., Ltd., X-40-3004A available from Shin-Etsu Chemical Co., Ltd., and the like.

Examples of peroxides used as curing agents (crosslinking agents) of peroxide-curable silicone adhesives include benzoyl peroxide, dicumyl peroxide, p-chlorobenzoyl peroxide, -2,4-dichlorobenzoyl peroxide, and di-t-butyl peroxide. The peroxides may be used alone or in combination of two or more kinds thereof. The amount of peroxide used may be about 0.5 to about 2.5 parts by mass per 100 parts by mass of the silicone adhesive.

Examples of the metal catalyst used as the curing agent (crosslinking agent) of the addition-reactive silicone adhesive include a platinum catalyst (for example, chloroplatinic acid catalyst), other VIIIB group (that is, groups 8, 9, and 10) catalysts, and a hydrosilylation catalyst. The metal catalyst may be used alone or in combination of two or more kinds thereof. The amount of the metal catalyst used may be about 0.5 to about 1.5 parts by mass per 100 parts by mass of the silicone adhesive.

In one embodiment, an electron-beam or gamma-curable silicone is used as the silicone adhesive. A silicone material useful in electron-beam or gamma-curable silicone may include, for example, polydiorganosiloxanes, and such a material includes a polysiloxane main chai.

As such a silicone material, a non-functionalized silicone material can be used. The non-functionalized silicone material may be a linear material described by the following formula describing a siloxane main chain containing aliphatic and/or aromatic substituents:

[Chemical Formula 1]

Formula (1)

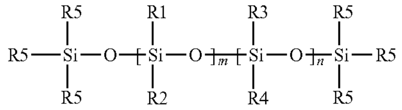

In Formula (1), R1, R2, R3, and R4 are independently selected from the group consisting of an alkyl group and an aryl group, each R5 is an alkyl group, n and m are integers, and at least one of m or n is not 0. In some embodiments, one or more alkyl or aryl groups may contain aalogen substituent (for example, fluorine). For example, in some embodiments, one or more alkyl groups are $—CH_2CH_2C_4F_9$.

In some embodiments, R5 is a methyl group, that is, a non-functionalized polydiorganosiloxane material is terminated with a trimethylsiloxy group. In some embodiments, R1 and R2 are alkyl groups and n is 0, that is, the material is poly(dialkylsiloxane). In some embodiments, the alkyl group is a methyl group, that is, poly(dimethylsiloxane) ("PDMS"). In some embodiments, R1 is an alkyl group, R2 is an aryl group, and n is 0, that is, the material is poly (alkylarylsiloxane). In some embodiments, R1 is a methyl group and R2 is a phenyl group, that is, the material is poly(methylphenylsiloxane). In some embodiments, R1 and R2 are alkyl groups, R3 and R4 are aryl groups, that is, the material is poly(dialkyldiarylsiloxane). In some embodiments, R1 and R2 are methyl groups, R3 and R4 are phenyl groups, that is, the material is poly(dimethyldiphenylsiloxane).

In some embodiments, the non-functionalized polydiorganosiloxane material can be branched. For example, one or more of the R1, R2, R3, and/or R4 groups can be linear or branched siloxane containing an alkyl or aryl (including an alkyl halide or aryl) substituent and a terminal R5 group.

In the present disclosure, the "non-functional group" is any of an alkyl or aryl group consisting of carbon, hydrogen, or, in some embodiments, a halogen (for example, fluorine) atom. As used herein, the "non-functionalized polydiorganosiloxane material" is one in which the R1, R2, R3, R4, and R5 groups are non-functional groups.

Generally, a functionalized silicone-base material contains unique reactive groups (for example, hydrogen, hydroxyl, vinyl, allyl or acrylic group) boded to the polysiloxane main chain of a starting material. As used herein, the "functionalized polydiorganosiloxane material" is one in which at least one of the R groups of Formula (2) below is a functional group.

[Chemical Formula 2]

Formula (2)

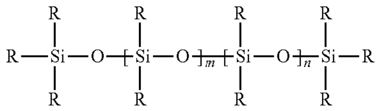

In some embodiments, the functionalized polydiorganosiloxane material is one in which at least two R groups are functional groups. Generally, the R groups of Formula (2) may be independently selected. In some embodiments, the at least one functional group is selected from the group consisting of a hydride group, a hydroxy group, an alkoxy group, a vinyl group, an epoxy group, and an acrylate group.

In addition to the functional R groups, the R groups may be non-functional groups, for example, alkyl or aryl groups including halogenated (for example, fluorinated) alkyl and aryl groups. In some embodiments, the functionalized polydiorganosiloxane material can be branched. For example, one or more R groups may be linear or branched siloxanes with functional substituents and/or non-functional substituents.

An electron-beam or gamma-curable silicone adhesive can be prepared by combining one or more polydiorganosiloxane materials (for example, silicone oil or fluid) with a suitable adhesive-imparting resin (for example, an MQ resin) as desired, coating the resulting mixture, and curing using electron beam (E-beam) or gamma irradiation. In general, any known additives useful in blending adhesives can also be included.

In one embodiment, modified silicone is used as the silicone adhesive. Here, in the present disclosure, the "modified silicone" means silicone in which a functional group (for example, a functional group having a urethane structure) is imparted to a main chain of silicone. The modified silicone adhesive may be used alone or in combination of two or more kinds thereof, and may be used in combination with unmodified silicone adhesives as described above.

In one embodiment, the elastic modulus at −20° C. or lower of the silicone adhesive layer containing the modified silicone is about $2\times10^5$ Pa or greater, about $5\times10^5$ Pa or greater, or about $1\times10^6$ Pa or greater, and about $7\times10^7$ Pa or less, about $3\times10^7$ Pa or less, or about $2\times10^7$ Pa or less. Here, the elastic modulus is a value measured using a viscoelasticity measuring device Discovery HR2 (available from TA Instrument, DE, USA) under the conditions of a parallel plate φ of 8 mm, a temperature raising rate of 3° C./min, a measurement temperature range of −65° C. to 150° C., and a frequency of 1 Hz (6.28 radians/second).

In one embodiment, the weight average molecular weight of the soft segment (silicone portion) of the modified silicone contained in the silicone adhesive layer is independently 5000 or greater, about 10000 or greater, about 15000 or greater, and is about 70000 or less, about 60000 or less, or about 50000 or less.

The modified silicone is silicone in which a functional group (for example, a functional group having a urethane structure) is imparted to a main chain of silicone, and typically, a silicone moiety constituting the main chain constitutes a soft segment, and a functional group moiety constitutes a hard segment. In one embodiment, the mass ratio of the soft segment to the hard segment in the modified silicone contained in the silicone adhesive layer is soft segment: hard segment=in a range of about 1,000: about 1 to about 50: about 1, about 900: about 1 to about 100: about 1, or about 600: about 1 to about 200: about 1.

The modified silicone is not particularly limited, and can include, for example, at least one type selected from the group consisting of a silicone polyurea block copolymer, a silicone polyoxamide block copolymer, and a silicone polyoxamide-hydrazide block copolymer.

In one embodiment, the silicone polyurea block copolymer contains polydiorganosiloxane diamine (may be referred to as "silicone diamine") polyisocyanate, and optionally a reaction product with an organic polyamine. The silicone polyurea block copolymer can be used alone or in combination of two or more kinds thereof.

Suitable silicone polyurea block copolymers are represented by repeat units of Formula I:

[Chemical Formula 3]

Formula I

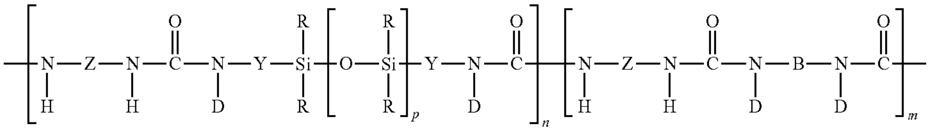

In Formula I, Rs are each independently preferably an alkyl moiety having about 1 to 12 carbon atoms, for example, a moiety that may be substituted with a trifluoroalkyl group or a vinyl group, or preferably a higher alkenyl group represented by represented by Formula $R^2(CH_2)_a CH{=}CH_2$ (in the formula, $R^2$ is $-(CH_2)_b-$ or $(CH_2)_c CH{=}CH-$, a is 1, 2, or 3, b is 0, 3, or 6, c is 3, 4, or 5), a cycloalkyl moiety having about 6 to 12 carbon atoms, a moiety that may be substituted with an alkyl group, a fluoroalkyl group, and a vinyl group, or preferably an aryl moiety having about 6 to 20 carbon atoms, such as a moiety that may be substituted with an alkyl group, a cycloalkyl group, a fluoroalkyl group, and a vinyl group, alternatively, Rs are a perfluoroalkyl group disclosed in U.S. Pat. No. 5,028,679, a fluorine-containing group disclosed in U.S. Pat. No. 5,236,997, and a perfluoropolyether-containing group disclosed in U.S. Pat. Nos. 4,900,474 and 5,118,775; preferably, at least 50% of the R moiety is a methyl group, the balance is a monovalent alkyl or substituted alkyl group having 1 to 20 carbon atoms, an alkenyl group, a phenyl group, or a substituted phenyl group; Zs are each a polyvalent group, preferably, an arylene group or an aralkylene group having about 6 to 20 carbon atoms, preferably an alkylene or cycloalkylene group having about 6 to 20 carbon atoms, preferably, Z is 2,6-toluylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methyleneticlohexylene, 1,6-hexamethylene, 1,4-cyclohexylene, 2,2,4-trimethylhexylene, and a mixture thereof; Ys are each independently an alkylene group having 1 to 10 carbon atoms, preferably a polyvalent group of an aralkylene group or an arylene group having 6 to 20 carbon atoms; Ds are each selected from the group consisting of hydrogen, an alkyl group having 1 to 10 carbon atoms, phenyl, and a group that completes the ring structure together with B or Y to form a heterocycle; in Formula I, B is a polyvalent group selected from the group consisting of alkylene, aralkylene, cycloalkylene, polyalkylene oxides such as polyethylene oxide, polypropylene oxide, polytetramethylene oxide, and copolymers and mixtures thereof; m is a number from 0 to about 1,000; n is a number of at least 1; and p is a number of at least 10, preferably from about 15 to about 2,000, and more preferably from 30 to 1500.

Useful silicone polyurea block copolymers are disclosed, for example, in U.S. Pat. Nos. 5,512,650, 5,214,119, and 5,461,134, WO 96/17726, 96/34028, 96/34030, and 97/40103.

Examples of useful silicone diamines used in the synthesis of silicone polyurea block copolymers are polydiorganosiloxane diamines represented by Formula II below. Preferably, the number average molecular weight of the polydiorganosiloxane diamine is about 700 g/mol or greater:

[Chemical Formula 4]

Formula II

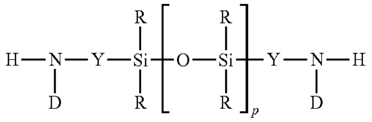

In Formula II, R, Y, D, and p are each defined as above.

Useful polydiorganosiloxane diamines may include any of the polydiorganosiloxane diamines within the range of Formula II. Among these, from the viewpoint of application and releasing potential to wallpaper, and the balance of retention of members, polydiorganosiloxane diamines having a number average molecular weight of about 700 g/mol or greater, about 1000 g/mol or greater, about 3000 g/mol or greater, about 5000 g/mol or greater, about 10000 g/mol or greater, about 15000 g/mol or greater, about 20000 g/mol or greater, or about 25000 g/mol or greater, and about 150000 g/mol or less, about 100000 g/mol or less, about 80000 g/mol or less, about 60000 g/mol or less, about 50000 g/mol or less, or about 40000 g/mol or less may be suitably used.

Suitable synthesis methods for polydiorganosiloxane diamine and polydiorganosiloxane diamine are published, for example, in U.S. Pat. Nos. 3,890,269, 4,661,577, 5,026,890, 5,276,122, WO 95/03354, and WO 96/35458.

Examples of useful polydiorganosiloxane diamines include polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and a mixture or a copolymer thereof.

Suitable polydiorganosiloxane diamines are commercially available, for example, from SEH America Inc, Huls America Inc., CA. The polydiorganosiloxane diamine is preferably substantially pure and may be synthesized, for example, in a manner as published in U.S. Pat. No. 5,214,119. Such high purity polydiorganosiloxane diamine can be synthesized by reacting a cyclic organosilane with a bis(aminoalkyl)disiloxane in a two-step reaction step using an anhydrous aminoalkyl functional silanolate catalyst such as tetramethylammonium-3 aminopropyl dimethylsilanolate, preferably in an amount of less than 1.15% by weight based on the total amount of the cyclic organosilane. Particularly preferably, the polydiorganosiloxane diamine is synthesized using cesium and rubidium catalysts, and such synthesis methods are published, for example, in U.S. Pat. No. 5,512,650.

The polydiorganosiloxane diamine component may provide means for adjusting the elastic modulus of the synthesized silicone polyurea block copolymer. In general, high molecular weight polydiorganosiloxane diamines can result in low elastic modulus copolymers, whereas low molecular weight polydiorganosiloxane polyamines can result in high elastic modulus copolymers.

Examples of useful polyamines include polyoxyalkylene diamines, including polyoxyalkylene diamines available from HUNTSMAN (Houston, Texas) under trade name: JEFFAMINE (trade name) D-230 (that is, polyoxypropylene diamine having a number average molecular weight of 230 g/mol), JEFFAMIN (trade name) D-400 (that is, polyoxypropylene diamine having a number average molecular weight of 400 g/mol), JEFFAMIN (trade name) D-2000 (that is, polyoxypropylene diamine having a number average molecular weight of 2,000 g/mol), JEFFAMINE (trade name) D-4000, JEFFAMINE (trade name) ED-2001, and JEFFAMINE (trade name) EDR-148 (that is, triethylene glycol diamine), and for example, polyoxyalkylene triamines including polyoxyalkylene triamine available from HUNTSMAN under trade names T-403, T-3000, and T-5000, and alkylenediamines including ethylenediamine and polyalkylenes available from DuPont (Wilmington, Delaware) under trade names Dytek (trade name) A and Dytek (trade name) EP.

Any polyamine may provide means for adjusting the elastic modulus of the copolymer. By adjusting the concentration, type, molecular weight of the organic polyamine, the elastic modulus of the silicone polyurea block copolymer can be adjusted.

In one embodiment, the silicone polyurea block copolymer contains polyamine preferably about 3 moles or lower, and more preferably from about 0.25 moles to about 2 moles. Preferably, the polyamine has a number average molecular weight of about 300 g/mol or less.

The polyisocyanate is not particularly limited, and for example, diisocyanate and triisocyanate can be used.

Examples of suitable diisocyanates include aromatic diisocyanates such as 2,6-Toluene diisocyanate, 2,5-toluene diisocyanate, 2,4-toluene diisocyanate, m-phenylene diisocyanate, p-phenylene diisocyanate, methylenebis(o-chlorophenyldiisocyanate), methylenediphenylene-4,4'-diisocyanate, polycarbonate diimide-modified methylene diphenylene diisocyanate, (4,4'-diisocyanate-3,3',5,5'-tetraethyl) diphenylmethane, 4,4-diisothianate-3,3'-dimethoxybiphenyl (o-dianisidine diisocyanate), 5-chloro-2,4-toluene diisocyanate, and 1-chloromethyl-2,4-diisocyanate benzene; aromatic-aliphatic diisocyanates such as m-xylene diisocyanate and tetramethyl-m-xylene diisocyanate; aliphatic diisocyanates such as 1,4-diisocyanate butane, 1,6-diisocyanate hexane, 1,12-diisocyanate dodecane, and 2-methyl-1,5-diisocyanate pentane; and cyclic aliphatic diisocyanates such as methylenedicyclohexylene-4,4'-diisocyanate, 3-isocyanate methyl-3,5,5-trimethylcyclohexylisocyanate (isophorone diisocyanate), and cyclohexylene-1,4-diisocyanate.

Any triisocyanate capable of reacting with polyamine, particularly polydiorganosiloxane diamine, is suitable. Examples of such triisocyanates are multifunctional isocyanates produced from biuret, isocyanurate, and adducts. Examples of commercially available polyisocyanates are a part of a series of polyisocyanates available under the trade names DESMODUR (trade name) and MONDUR (trade name) from Bayer AG, DURANATE (trade name) from Asahi Kasei Corporation and PAPI (trade name) from Dow Plastics.

The polyisocyanate is preferably present in a stoichiometric amount based on the amount of polydiorganosiloxane diamine and any polyamine.

The silicone polyurea block copolymer can be synthesized, for example, by a solvent-based reaction, a solventless reaction, or a combination thereof. Effective solvent-based step is, for example, "Tyagi et al." Segmented Organosiloxane copolymer: 2. Effective solvent-based steps are described, for example, by Tyagi et al., "Segmented Organicosiloxane Copolymers: 2. Thermal and Mechanical Properties of Siloxane-Urea Copolymer), Polymer, Vol. 25, December (1984), U.S. Pat. No. 5,214,119 (Leir). Useful manufacturing methods of the silicone polyurea block copolymer are also described, for example, in U.S. Pat. Nos. 5,512,650, 5,214,119, 5,461,134, WO 96/35458, WO 98/17726, WO 96/34028, and WO 97/40103.

The adhesive composition containing the silicone polyurea block copolymer can be prepared, for example, using a solvent-based reaction, a solventless reaction, or a combination thereof.

In a solvent-based reaction, an MQ resin, if present, can be introduced before, during, or after the polyamine and polyisocyanate are introduced into the reaction mixture. The reaction of the polyamine and polyisocyanate may be performed in a single solvent or a mixed solvent. Preferably, the solvent does not react with the polyamine and polyisocyanate. A starting material and a final product preferably remain completely mixed in the solvent during the middle of the polymerization reaction and after the completion of the polymerization reaction. These reactions can be performed at temperatures from room temperature or to boiling point of the reaction solvent. The reaction is preferably performed at an ambient temperature up to about 50° C.

When the MQ resin is present, in a substantially solventless reaction, the polyamine and polyisocyanate are mixed with the MQ resin in a reaction vessel, and the polyamine and polyisocyanate can react to produce the silicone polyurea block copolymer, and the product can react with the MQ resin to produce an adhesive composition.

One useful method involving a solvent-based reaction and a solvent-free reaction when the MQ resin is present is to prepare a silicone polyurea block copolymer using the solvent-free reaction followed by mixing a silicone polyurea block copolymer and an MQ resin solution in a solvent. Preferably, a silicone polyurea block copolymer-based adhesive composition may be synthesized by the combination method described above which produces a mixture of the silicone polyurea block copolymer and the MQ resin.

In one embodiment, the silicone polyoxamide block copolymer and the silicone polyoxamide-hydrazide copolymer have at least two repeat units of Formula A:

[Chemical Formula 5]

Formula A

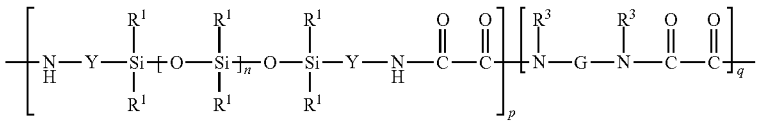

In Formula A, $R^1$s are each independently alkyl, haloalkyl, aralkyl, alkenyl, or aryl, or aryl substituted with alkyl, alkoxy, or halo; Ys are each independently alkylene, aralkylene, or a combination thereof; Gs are each independently a bond, or a divalent residue corresponding to the one obtained by subtracting two —$NHR^3$ groups from the diamine of Formula $R^3HN$-G-$NHR^3$, $R^3$s are each independently hydrogen or alkyl, or each $R^3$ forms a heterocyclic group with G and nitrogen to which both $R^3$ and G are bonded; ns are each independently an integer of 0 to 1500; ps are each independently an integer of 1 to 10; and qs are each independently an integer of 1 or greater. q of at least 50% is an integer 2.

An alkyl group suitable for $R^1$ in Formula A typically has 1 to 10, 1 to 6, or 1 to 4 carbon atoms. Exemplary alkyl groups include, but are not limited to, methyl, ethyl, isopropyl, n-propyl, n-butyl, and iso-butyl. A haloalkyl group suitable for $R^1$ often only has some of the hydrogen atoms of the corresponding alkyl group substituted with halogen. Exemplary haloalkyl groups include chloroalkyl and fluoroalkyl groups with 1 to 3 halo atoms and 3 to 10 carbon atoms. An alkenyl group suitable for $R^1$ often has 2 to 10 carbon atoms. Exemplary alkenyl group often include ethenyl, n-propenyl, and n-butenyl having 2 to 8, 2 to 6, or 2 to 4 carbon atoms. An aryl group suitable for $R^1$ has 6 to 12 carbon atoms. Phenyl is an exemplary aryl group. This aryl group can be unsubstituted or substituted by alkyl (for example, alkyl having 1 to 10 carbon atoms, 1 to 6 carbon atoms, or 1 to 4 carbon atoms), alkoxy (for example, alkoxy having 1 to 10 carbon atoms, 1 to 6 carbon atoms, or 1 to 4 carbon atoms), or halo (for example, chloro, bromo, or fluoro). An aralkyl group suitable for $R^1$ typically has an alkylene group having 1 to 10 carbon atoms and an aryl group having 6 to 12 carbon atoms. In some exemplary aralkyl groups, the aryl group is phenyl, the alkylene group has 1 to 10 carbon atoms, 1 to 6 carbon atoms, or 1 to 4 carbon atoms (that is, the structure of aralkyl is alkylene-phenyl, wherein alkylene is bonded to a phenyl group).

In one embodiment, at least 40%, and preferably at least 50% of the $R^1$ groups in some repeat units of Formula A are methyl. For example, at least 60%, at least 70%, at least 80%, at least 90%, at least 95%, at least 98%, or at least 99% $R^1$ group may be methyl. The remaining $R^1$ groups can be selected from alkyl, haloalkyl, aralkyl, alkenyl, aryl, or aryl substituted with alkyl, alkoxy, or halo having at least two carbon atoms.

Ys in Formula A are each independently alkylene, aralkylene, or a combination thereof. A suitable alkylene group typically has up to 10 carbon atoms, up to 8 carbon atoms, up to 6 carbon atoms, or up to 4 carbon atoms. Exemplary alkylene groups include methylene, ethylene, propylene, and butylene. A suitable aralkylene group typically has an arylene group having 6 to 12 carbon atoms bonded to an alkylene group having 1 to 10 carbon atoms. In some exemplary aralkylene groups, the arylene moiety is phenylene. That is, the divalent aralkylene group is phenylene-alkylene; wherein the phenylene is bonded to alkylene having 1 to 10, 1 to 8, 1 to 6, or 1 to 4 carbon atoms. As used herein, with respect to the Y group, "combination thereof" means a combination of two or more groups selected from alkylene groups and aralkylene groups. For example, the combination may be a single aralkylene (for example, alkylene-arylene-alkylene) bonded to a single alkylene. In one exemplary alkylene-arylene-alkylene combination, the arylene is phenylene and each alkylene has 1 to 10, 1 to 6, or 1 to 4 carbon atoms.

Gs in Formula A are independently a bond or a residue unit corresponding to the diamine compound of $R^3$HN-G-NH$R^3$ excluding two amino groups (that is, —NH$R^3$ group). When G is a bond, the copolymer is a silicone polyoxamide-hydrazide. In one embodiment, G is a bond, and each $R^3$ is hydrogen.

When G is a residue unit, the copolymer is a silicone polyoxamide. The diamine can have a primary or secondary amino group. The $R^3$ group is hydrogen or alkyl (for example, alkyl having 1 to 10, 1 to 6, or 1 to 4 carbon atoms), or $R^3$ forms G and a heterocyclic group (for example, $R^3$HN-G-NH$R^3$ is piperazine) together with the nitrogen to which $R^3$ and G are both bonded. In most embodiments, $R^3$ is hydrogen or alkyl. In many embodiments, both amino groups of the diamine are primary amino groups (that is, both $R^3$ groups are hydrogen), and the diamine has the formula $H_2N$-G-$NH_2$.

In one embodiment, G is alkylene, heteroalkylene, arylene, aralkylene, or a combination thereof. Suitable alkylene often has 2 to 10, 2 to 6, or 2 to 4 carbon atoms. Exemplary alkylene groups include ethylene, propylene, butylene, and those similar to these. Suitable heteroalkylenes are often polyoxyalkylenes such as polyoxyethylene having at least two ethylene units, polyoxypropylene having at least two propylene units, or copolymers thereof. A suitable aralkylene group typically contains an arylene group having 6 to 12 carbon atoms bonded to an alkylene group having 1 to 10 carbon atoms. Some exemplary aralkylene groups are phenylene-alkylene; wherein the phenylene is bonded to alkylene having 1 to 10 carbon atoms, 1 to 8 carbon atoms, 1 to 6 carbon atoms, or 1 to 4 carbon atoms. As used herein, with respect to a G group, "combination thereof" means a combination of two or more groups selected from alkylene, heteroalkylene, polydiorganosiloxane, arylene, and aralkylene. For example, the combination may be aralkylene (for example, alkylene-arylene-alkylene) bonded to alkylene. In one exemplary alkylene-arylene-alkylene combination, the arylene is phenylene and each alkylene has 1 to 10, 1 to 6, or 1 to 4 carbon atoms.

Each subscript n in Formula A is independently an integer of 0 to 1,500. For example, the subscript n may be an integer of up to 1,000, up to 500, up to 400, up to 300, up to 200, up to 100, up to 80, or up to 60, up to 40, up to 20, or up to 10. The value of n is often at least 1, at least 2, at least 3, at least 5, at least 10, at least 20, or at least 40. For example, the subscript n may range from 40 to 1,500, 0 to 1,000, 40 to 1,000, 0 to 500, 1 to 500, 40 to 500, to 400, 1 to 300, 1 to 200, 1 to 100, 1 to 80, 1 to 40, or 1 to 20.

Each subscript p is independently an integer of 1 to 10. For example, the value of p is often an integer of up to 9, up to 8, up to 7, up to 6, up to 5, up to 4, up to 3, or up to 2. The value of p may range from 1 to 8, 1 to 6, or 1 to 4.

Each subscript q is independently an integer of 1 or greater, and at least 50% of q is an integer of 2. In one embodiment, at least 75%, at least 90%, at least 99%, or all of q is an integer of 2.

In one embodiment, the silicone polyoxamide block copolymer and the silicone polyoxamide-hydrazide block copolymer tend to be free of groups having the following formula: —$R^a$—(CO)—NH— (wherein $R^a$ is alkylene). All carbonylamino groups along the main chain of the copolymer material are a part of an oxallylamino group (for example, —(CO)—(CO)—NH-group). That is, any carbonyl group along the main chain of the copolymer material is bonded to another carbonyl group and is a part of an oxallyl group. More specifically, the copolymer contains a plurality of aminoxalylamino groups.

The silicone polyoxamide block copolymer and the silicone polyoxamide-hydrazide block copolymer may be linear block copolymers (that is, there include hard blocks and soft blocks), and elastomers. These tend to have more excellent solvent resistance than known polydiorganosiloxane polyoxamides. Some copolymers are insoluble, for example, insoluble in toluene or even tetrahydrofuran. Here, the following method may determine whether the copolymer is "insoluble" or not in a specific solvent. About 1 g of sample copolymer was placed in a jar, about 100 g of a desired solvent was added, the jar was sealed and placed on a roller under ambient temperature for about 4 hours. A copolymer sample is considered insoluble if 90% or greater of original mass thereof is retained after drying to constant weight.

The silicone polyoxamide block copolymer and the silicone polyoxamide-hydrazide block copolymer can be prepared, for example, according to the methods of the present disclosure. The following methods can be used to produce copolymer materials having at least two repeat units of Formula B:

[Chemical Formula 6]

Formula B

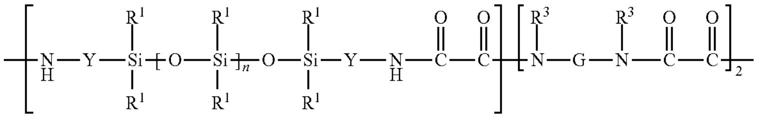

In Formula B, $R^1$s are each independently alkyl, haloalkyl, aralkyl, alkenyl, or aryl, or aryl substituted with alkyl, alkoxy, or halo; Ys are each independently alkylene, aralkylene, or a combination thereof; Gs are each independently a bond, or a divalent residue corresponding to the one obtained by subtracting two —$NHR^3$ groups from diamine of Formula $R^3HN\text{-}G\text{-}NHR^3$, $R^3$s are each independently hydrogen or alkyl, or each $R^3$ forms a heterocyclic group with G and nitrogen to which both $R^3$ and G are bonded; and ns are each independently an integer of 0 to 1500.

Suitable examples of $R^1$, Y, G, and $R^3$ are similar to those described above for Formula A.

The first step of the method of the present disclosure may include the use of the compound of Formula C below:

[Chemical Formula 7]

Formula C

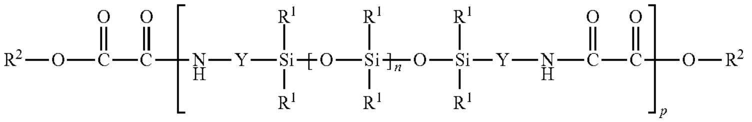

In Formula C, p is an integer of 1 to 10.

The compound of Formula C contains at least one polydiorganosiloxane segment and at least two oxallylamino groups. $R^1$, Y, and subscript n are similar to those described for Formula B, where p is an integer of 1 to 10. $R^2$ groups are each independently alkyl, haloalkyl, or aryl, or aryl substituted with alkyl, alkoxy, halo, or alkoxycarbonyl, or is bonded via N to the following Formula D:

[Chemical Formula 8]

Formula D

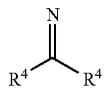

In Formula D, $R^4$s each are independently hydrogen, alkyl, or aryl, or $R^4$ together form a ring.

The alkyl and haloalkyl groups suitable for $R^2$ in Formula C often have 1 to 10, 1 to 6, or 1 to 4 carbon atoms. Although it is possible to use tertiary alkyl (for example, t-butyl) and haloalkyl groups, there are often primary or secondary carbon atoms directly attached (that is, bonded) to adjacent oxy groups. Exemplary alkyl groups include methyl, ethyl, n-propyl, isopropyl, n-butyl, and iso-butyl. Exemplary haloalkyl groups include chloroalkyl groups and fluoroalkyl groups; wherein some (but not all) of the hydrogen atoms on the corresponding alkyl groups are substituted with halo atoms. For example, a chloroalkyl group or a fluoroalkyl group can be chloromethyl, 2-chloroethyl, 2,2,2-trichloroethyl, 3-chloropropyl, 4-chlorobutyl, fluoromethyl, 2-fluoroethyl, 2,2,2-trifluoroethyl, 3-fluoropropyl, 4-fluorobutyl, and the like. Examples of the aryl group suitable for $R^2$ include those having 6 to 12 carbon atoms, such as phenyl. The aryl group can be unsubstituted or substituted by alkyl (for example, alkyl having 1 to 4 carbon atoms, such as methyl, ethyl, or n-propyl), alkoxy (for example, alkoxy having 1 to 4 carbon atoms, such as methoxy, ethoxy, or propoxy), halo (for example, chloro, bromo, or fluoro), or alkoxycarbonyl (for example, alkoxycarbonyl having 2 to 5 carbon atoms, such as methoxycarbonyl, ethoxycarbonyl or propoxycarbonyl).

A compound of Formula C can include a single compound (that is, all of the compounds have the same value for p and n) or can include multiple compounds (that is, compounds have different values for p, different values for n, or different values for both p and n). Compounds with different n values have different lengths of siloxane chains. The compounds with at least two p values have extended chains.

In one embodiment, there is a mixture of the first compound of Formula C where the subscript p is equal to 1 and the second compound of Formula C, wherein the subscript p is equal to at least 2. The first compound can include a plurality of different compounds having different n values. The second compound can include multiple compounds having different values for both different p-value, different n values, or both p and n. The mixture can contain at least 50% by mass of the first compound of Formula C (that is, p is equal to 1) and 50% by mass or less of the second compound of Formula C (that is, p is equal to at least 2), based on the total weight of the first and second compounds in the mixture. In some mixtures, the first compound is present in an amount of at least 55% by mass, at least 60% by mass, at least 65% by mass, at least 70% by mass, at least 75% by mass, at least 80% by mass, at least 85% by mass, at least 90% by mass, at least 95% by mass, or at least 98% by mass, based on the total amount of the compound of Formula C. The mixture often contains 50% by mass or less, 45% by mass or less, 40% by mass or less, 35% by mass or less, 30% by mass or less, 25% by mass or less, 20% by mass or less, 15% by mass or less, 10% by mass or less, 5% by mass or less, or 2% by mass or less of the second compound.

In the mixture, different amounts of the compounds of Formula C in which the chain is extended may affect the ultimate nature of the elastomeric material of Formula B. That is, the amount of the second compound of Formula C (that is, p is equal to at least 2) can be advantageously varied to provide an elastomeric material with a series of properties. For example, increasing the second compound of Formula C can adjust the melt rheology (for example, causing an elastomeric material to flow more easily when present as a melt), adjust the flexibility of the elastomeric material, decrease the elastic modulus of the elastomeric material, or realize a combination thereof.

In the first step of the method of the present disclosure, under reaction conditions, the compound of Formula C and the diamine of the molar excess of the following Formula E are combined.

[Chemical Formula 9]

Formula E

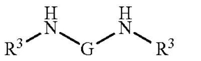

$R^3$ groups and a G group in Formula E are similar to those described for Formula B.

The diamines of Formula E may optionally be classified as organic diamines or as polydiorganosiloxane diamines with organic diamines selected from, for example, alkylene diamine, heteroalkylene diamine, arylene diamine, aralkylene diamine, or alkylene-aralkylene diamine. The diamine may have only two amino groups, such that the resulting polydiorganosiloxane polyoxamide and polyoxamide-hydrazide are linear block copolymers, which are often elastomers, melt at a high temperature, and are soluble in some common organic solvents. The diamine does not have polyamine having more than two primary or secondary amino groups. A tertiary amine that does not react with the compound of Formula C may be present.

Exemplary polyoxyalkylene diamines (that is, G is heteroalkylene in which the heteroatom is oxygen) include, but are not limited to, those commercially available from HUNTSMAN (Woodlands, TX) under the trade names JEFFAMINE (trade name) D-230, JEFFAMINE (trade name) D-400, JEFFAMINE (trade name) D-2000, and JEFFAMINE (trade name) EDR-148 listed above, as well as JEFFAMINE (trade name) HK-511 (that is, polyether diamine containing both an oxyethylene group and an oxypropylene group and having a number average molecular weight of 220 g/mol) and JEFFAMINE ED-2003 (that is, polyethylene glycol terminal-protected with polypropylene oxide, and having a number average molecular weight of 2000 g/mol).

Exemplary alkylene diamines (that is, G is alkylene) include, but are not limited to, ethylene diamine, propylene diamine, butylene diamine, hexamethylene diamine, 2-methylpentmethylene 1,5-diamine (that is, commercially available from DuPont, (Wilmington, DE) under trade name DYTEK (trade name) A), 1,3-pentanediamine (commercially available from DuPont under the trade name DY ILK (trade name) EP), 1,4-cyclohexane diamine, 1,2-cyclohexane diamine (commercially available from DuPont under the trade name DHC-99 commercially available from DuPont), 4,4'-bis(aminocyclohexyl) methane, and 3-aminomethyl-3,5,5-trimethylcyclohexylamine.

Exemplary arylene diamine (that is, G is arylene such as phenylene) include, but is not limited to, m-phenylene diamine, o-phenylene diamine, and p-phenylene diamine Exemplary aralkylene diamines (that is, G is aralkylene, such as alkylene-phenyl) include, but are not limited to, 4-aminomethyl-phenylamine, 3-aminomethyl-phenylamine, and 2-aminomethyl-phenylamine. Exemplary alkylene-aralkylene diamines (that is, G is alkylene-aralkylene such as alkylene-phenylene-alkylene) include, but are not limited to, 4-aminomethyl-benzylamine, 3-aminomethyl-benzylamine, and 2-aminomethyl-benzylamine.

Exemplary hydrazine (that is, G is a bond) include, but are not limited to, hydrazine and N,N'-diaminopiperidine.

In some preferred embodiments, the diamine of Formula E is selected from the group consisting of hydrazine, 1,2-diaminoethane, 1,3-diaminopropane, 1,4-diaminobutane, 1,5-diaminopentane, 2-methyl-5-pentanediamine, 1,6-diaminohexane, and m-xylenediamin.

The reaction of the compound of Formula C with the molar excess of the diamine of Formula E results in an amine-terminated polymer of Formula F:

[Chemical Formula 10]

Formula F

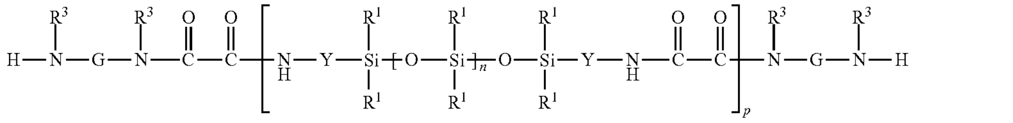

The reaction can be performed using a plurality of compounds of Formula C, a plurality of diamines, or a combination thereof. A plurality of the compounds of Formula C having different number average molecular weights can be combined with a single diamine or a plurality of diamines under the reaction conditions. For example, the compounds of Formula C may include a mixture of materials having different values, having different n values, or with different values for both n and p. The plurality of diamines can include, for example, first diamine which is organic diamine and second diamine which is polydiorganosiloxane diamine. Similarly, a single compound of Formula C can also be combined with a plurality of diamines under the reaction conditions.

The condensation reaction of the compound of Formula C with a diamine is often performed at room temperature or at a high temperature (for example, at a temperature of up to about 250° C.). For example, this reaction can often be performed at a temperature of room temperature or up to about 100° C. In other examples, the reaction can be performed at a temperature of at least about 100° C., at least about 120° C., or at least about 150° C. For example, this reaction temperature is often in the range of about 100° C. to about 220° C., in the range of about 120° C. to about 220° C., or in the range of about 150° C. to about 200° C. This condensation reaction is often completed in less than about 1 hour, less than about 2 hours, less than about 4 hours, less than about 8 hours, or less than about 12 hours.

The reaction may occur in the presence or absence of a solvent. Suitable solvents usually do not react with the reactants or products involved in the reaction. Further, typically, suitable solvents are capable of maintaining all reactants and all products in solution throughout the process. Exemplary solvents include, but are not limited to, toluene, tetrahydrofuran, dichloromethane, aliphatic hydrocarbons (for example, alkanes such as hexanes) or mixtures thereof.

After completion of the reaction, the excess diamine and solvent if present are removed. The excess diamine can be removed, for example, by vacuum distillation.

The amine-terminated polymer of Formula F obtained is then treated with oxalato ester to form a repeat unit of Formula F utilizing an amine-terminated group. Useful oxalate esters have the following Formula G:

[Chemical Formula 11]

Formula G

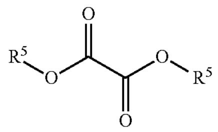

Oxalates of Formula G can be prepared, for example, by reacting alcohols of Formula $R^5$—OH with oxalyl dichloride. Commercial oxalates of Formula G (for example, from Sigma-Aldrich (Milwaukee, WI) and VWR International (Bristol, CT)) include, but are not limited to, dimethyloxalate, diethyl oxalate, di-n-butyl oxalate, di-tert-butyl-oxalate, bis(phenyl) oxalate, bis(pentafluorophenyl) oxalate, 1-(2,6-difluorophenyl)-2-(2,3,4,5,6-pentachlorophenyl) oxalate, and bis(2,4,6-trichlorophenyl) oxalate.

Particularly useful oxalate esters of Formula G include, for example, oxalate esters of phenol, ethanol, butanol, methyl ethyl ketone oxime, acetone oxime, and trifluoroethanol.

Any suitable reactor (for example, a glass container or a general container equipped with a stirrer) or a process can be used to prepare silicone polyoxamide block copolymers and silicone polyoxamide-hydrazide block copolymers according to the methods of the present disclosure. The reaction can be performed using a batch process, a semi-batch process, or a continuous process.

Any solvent present can be removed from the obtained polydiorganosiloxane polyoxamide or polyoxamide-hydrazide at the end of the reaction. This removal process is often performed at a temperature of at least about 100° C., at least about 125° C., or at least about 150° C. This removal process is typically performed at a temperature of lower than about 300° C., lower than about 250° C., or lower than about 225° C.

It may be desirable to perform the reaction in the absence of the solvent. In solvents that are not compatible with both the reactant and product, the reaction becomes incomplete and the degree of polymerization is low.

The blending amount of each of the peroxide-curable silicone, the addition-reactive silicone, the electron-beam or gamma-curable silicone, and the modified silicone in the silicone adhesive layer can be independently, for example, about 30% by mass or greater, about 35% by mass or greater, about 40% by mass or greater, about 45% by mass or greater, or about 50% by mass or greater, and can be about 90% by mass or less, about 85% by mass or less, about 80% by mass or less, about 75% by mass or less, about 70% by mass or less, about 65% by mass or less, about 60% by mass or less, or about 55% by mass or less, with respect to the total amount of the adhesive layer.

The silicone adhesive layer can contain, as an optional component, an adhesive-imparting agent (for example, MQ resin), an antioxidant, an ultraviolet absorber, a light stabilizer, a heat stabilizer, a dispersant, a plasticizer, a flow improver, a surfactant, a leveling agent, a silane coupling agent, a catalyst, a filler, a pigment, a dye, and the like as long as the effect of the present disclosure is not impaired. These optional components can be used alone or in combination of two or more kinds thereof.

In one embodiment, the silicone adhesive layer contains an MQ resin (may be referred to as an "MQ tackifying resin").

Examples of the useful MQ resin include at least one selected from the group consisting of an MQ silicone resin, an MQD silicone resin, and an MQT silicone resin. These MQ resins may have a number average molecular weight of about 100 or greater or about 500 or greater, about 50,000 or less, or about 20,000 or less, and may have a methyl substituent. Here, in the present disclosure, the "number average molecular weight" is a number average molecular weight in terms of polystyrene standard by the gel permeation chromatography (GPC) method.

The MQ silicone resin can include both a non-functional resin and a functional resin. The functional silicone resin has one or more functionalities, including, for example, silicon-bonded hydrogen, silicon-bonded alkenyl, or silanol groups.

The MQ silicone resin is a copolymerizable silicone resin having a $R'_3SiO_{1/2}$ unit (M unit) and a $SiO_{4/2}$ unit (Q unit). Such resins are disclosed, for example, in Encyclopedia of Polymer Science and Engineering, vol. 15, John Wiley Sons, New York, (1989), pp. 265-270, as well as U.S. Pat. No. 2,676,182 (Daudi et al.), U.S. Pat. No. 3,627,851 (Brady), U.S. Pat. No. 3,772,247 (Flannigan), and U.S. Pat. No. 5,248,739 (Schmidt et al.). The MQ silicone resin having a functional group is disclosed, for example, in U.S. Pat. No. 4,774,310 (Butler), which discloses silyl hydride groups; U.S. Pat. No. 5,262,558 (Kobayashi et al.), which discloses vinyl and trifluoropropyl groups; and U.S. Pat. No. 4,707,531 (Shirahata), which discloses silyl hydride and vinyl groups. The above-described resins may generally be prepared in a solvent. The dried or solventless MQ silicone resin can be prepared as disclosed in U.S. Pat. No. 5,319,040 (Wengrovis et al.), U.S. Pat. No. 5,302,685 (Tsumula et al.), and U.S. Pat. No. 4,935,484 (Wolfgruber et al.).

The MQD silicone resin is a terpolymer having a $R'_3SiO_{1/2}$ unit (M unit), a $SiO_{4/2}$ unit (Q unit), and a $R'_2SiO_{2/2}$ unit (D unit) as disclosed, for example, in U.S. Pat. No. 5,110,890 (Butler).

The MQT silicone resin is a terpolymer (MQT resin) having a $R'_3SiO_{1/2}$ unit (M unit), a $SiO_{4/2}$ unit (Q unit), and a $R'SiO_{3/2}$ unit (T unit).

The MQ silicone resin is typically supplied in an organic solvent. Examples of commercially available MQ silicone resins include SilGrip (trade name) SR-545 MQ resin in toluene available from Momentive Performance Materials Japan GK and an MQOH resin in toluene available from PCR, Inc. (Gainesville, Fla.). These organic solutions of the MQ silicone resins may be used as provided by the supplier or may be dried by any number of techniques known in the art to provide the MQ silicone resin at a non-volatile content of 100%. Examples of suitable drying methods include, but are not limited to, spray drying, oven drying, and steam separation drying.

The blending amount of the MQ resin in the adhesive layer can be, for example, about 30% by mass or greater, about 35% by mass or greater, about 40% by mass or greater, about 45% by mass or greater, or about 50% by mass or greater, and can be about 70% by mass or less, about 65% by mass or less, about 60% by mass or less, about 55% by mass or less, or about 50% by mass or less with respect to the total amount of the adhesive layer.

The silicone adhesive layer may or may not have a support such as paper, a plastic film, nonwoven, a foam layer, or the like.

The thickness of the silicone adhesive layer can be about 1 μm or greater, about 5 μm or greater, or about 10 μm or greater, and about 100 μm or less, about 80 μm or less, or about 50 μm or less. Here, the thickness of the adhesive layer is an average value of the thicknesses of at least five optional positions in the adhesive layer of the laminate obtained by measuring a cross-section in the thickness direction of the laminate using a scanning electron microscope. Such a thickness measurement method can be used similarly for the thickness of each layer constituting the laminate.

In one embodiment, the release strength of the silicone adhesive layer with respect to the release layer of the release liner is about 10 N/25 mm or less, about 7.5 N/25 mm or less, about 5.0 N/25 mm or less, about 3.0 N/25 mm or less, or about 1.5 N/25 mm or less, and about 0.01 N/25 mm or greater, about 0.02 N/25 mm or greater, about 0.05 N/25 mm or greater, about 0.10 N/25 mm or greater, or about 0.20 N/25 mm or greater. Here, the release strength is the release strength when releasing the release liner in a 180 degree direction at 300 mm/min based on JIS Z 0237.

A method for applying a silicone adhesive to a release liner to obtain a laminate is not particularly limited, and for example, a solvent coating method, an aqueous coating method, or a hot melt coating method such as notch bar coating, knife coating, roll coating, reverse roll coating, gravure coating, wire-wound rod coating, slot orifice coating, slot die coating, or extrusion coating. Any step such as drying or curing may be applied if necessary after applying the adhesive to the release liner. As described above, the laminate in which the silicone adhesive is applied to the release liner can be used in a tape such as a single-sided tape, a double-sided tape, an adhesive transfer tape, or the like.

The tape of one embodiment includes a release liner having a release layer disposed thereon and a silicone adhesive layer stacked on the release layer of the release liner. When used in an aspect in which the adhesive layer is isolated from the release sheet and attached to the adherend, the adhesive layer is also referred to as an adhesive transfer tape.

The tape of this embodiment may further include a support substrate such as paper, a plastic film, a (meth) acrylic resin, a foam material such as a urethane resin, non-woven fabric, or the like, stacked on the surface of the adhesive layer on the side opposite to the release liner. In this embodiment, in a case where a surface on the side opposite to the surface toward the adhesive layer of the support substrate has the second adhesive layer, it is in the form of so-called a double-sided tape. When the surface on the side opposite to the surface toward the adhesive layer of the support substrate does not have the adhesive layer, it is in the form of a so-called single-sided tape.

A laminate 100 having a configuration in which a release liner is applied to both sides of a silicone adhesive layer as illustrated in FIG. 1 can be produced, for example, by coating an adhesive on a release layer of a release liner 101 (first release liner) to form a silicone adhesive layer 103, and then bonding a separate second release liner 105 with the release layer interposed therebetween. The laminate having such a configuration can be used, for example, as an adhesive transfer tape.

Here, the two release liners (that is, the first release liner and the second release liner) included in the laminate having such a configuration may be the same type of release liners or different types of release liners. In one embodiment, the first release liner and the second release liner are both release liners having a bNSNF release layer, and the first release liner and the second release liner can also be a release liner having a fluorine-based release layer and a release liner having a bNSNF release layer, or a release liner having a bNSNF release layer and a release liner having a fluorine-based release layer, respectively. It is also possible to use a release liner having a different bNSNF release layer in the first release liner and the second release liner, respectively. From the viewpoint of cost and prevention of contamination of the fluorine component, it is advantageous that the two release liners are release liners each having a bNSNF release layer.

From the viewpoint of the usability of the laminate having such a configuration, it is preferable that the release strength of the silicone adhesive layer to the release layer of the first release liner and the release strength of the silicone adhesive layer to the release layer of the second release liner are different from each other by, about 2.0 times or more, about 2.5 times or more, or about 3.0 times or more, about 20 times or less, about 10 times or less, about 5.0 times or less, about 4.5 times or less, or about 4.0 times or less. As for the release strength of both, the release strength of the first adhesive layer to the release layer of the first release liner may be higher, or the release strength of the second adhesive layer to the release layer of the second release liner may be higher.

Figure 2:
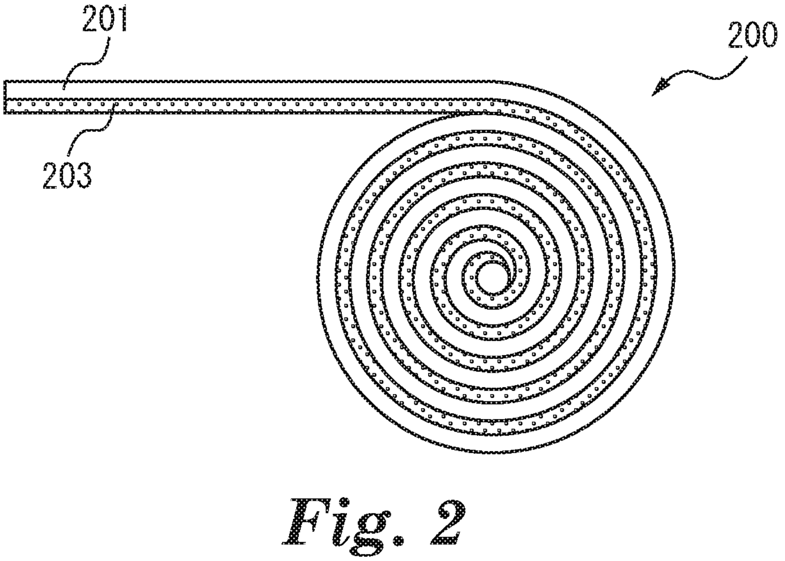
FIG. 2 is a schematic cross-sectional view of a roll body including a release liner and a silicone adhesive layer according to an embodiment of the present disclosure.

A roll body 200 as illustrated in FIG. 2 can be produced, for example, by coating one release layer of a release liner 201 having a release layer on both sides with an adhesive and winding it into a roll shape while forming a silicone adhesive layer 203. The roll body having such a configuration can be used, for example, as an adhesive transfer tape or the like.

Here, the two release layers included in the roll body having such a configuration may be the same type of release layers or different types of release layers. In one embodiment, the two release layers are both bNSNF release layers, and the two release layers can be a fluorine-based release layer and a bNSNF release layer or a bNSNF release layer and a fluorine-based release layer, respectively. Note that, it is also possible to use different bNSNF release layers in the two release layers. From the viewpoint of cost, environmental problems, and prevention of contamination of the fluorine component, it is advantageous that both of the two release layers are bNSNF release layers.

From the viewpoint of the usability of the roll body having such a configuration, it is preferable that the release strength of the silicone adhesive layer to the release layer (first release layer) of the two release layers of the release liner and the release strength of the silicone adhesive layer to the other release layer (second release layer) are different from each other by, about 2.0 times or more, about 2.5 times or more, or about 3.0 times or more, about 20 times or less, about 10 times or less, about 5.0 times or less, about 4.5 times or less, or about 4.0 times or less. As for the release strength of both, from the viewpoint of usability, the release strength of the adhesive layer to the release layer (that is, the release layer on a reference sign 201 side in FIG. 2) disposed on the outer peripheral side of the roll body is preferably lower than the release strength of the adhesive layer to the release layer (that is, the release layer on the side opposite to the reference sign 201 in FIG. 2) disposed on the inner peripheral side of the roll body.

In the release liner, the laminate, and the roll body of the present disclosure, other layers such as a printed layer, a decorative layer, and a concealing layer may optionally be disposed in a range that does not inhibit the effects of the present disclosure. Other layers may be applied on all sides or partially.

EXAMPLES

Specific embodiments of the present disclosure will be exemplified in the following examples; however, the present invention is not limited to these embodiments. All parts and percentages are based on mass unless otherwise specified. The numerical value essentially includes errors due to a measurement principle and a measurement device. The numerical value is indicated by a significant number that has undergone a normal rounding treatment.

Test Example 1

An adhesive tape prepared using the produced release liner was examined.

Table 1 shows various materials used. Here, “Mw” in the table means a weight average molecular weight. “Linear type”, “branched type”, and “number of carbon atoms” relate to an alkyl group of an alkyl (meth)acrylate monomer. Furthermore, regarding HCA-32, HCA-32 (2-tetradecyl octadecyl acrylate) was synthesized from the esterification reaction of 2-tetradecyl-1-octadecanol (iso-C32 alcohol) with acryloyl chloride using the reaction conditions and purification method disclosed in Method 2 on pages 8 to 9 (column 14, lines 63 to column 15, line 8) in specification of U.S. Pat. No. 8,137,807.

TABLE 1

| Type | Trade name, model No., or abbreviation | Description | Source of supply |
|---|---|---|---|
| Monomer (polymerizable component) | STA (ODA) | Stearyl acrylate (octadecyl acrylate) Linear type, carbon atom number: 18 | Osaka Organic Chemical Industry Ltd. (Osaka-shi, Osaka, Japan) |
| | VA | Behenyl acrylate Linear type, carbon atom number: 22 | NOF CORPORATION (Shibuya-ku, Tokyo, Japan) |
| | ISA | Isostearyl acrylate (isooctadecyl acrylate) Branched type, carbon atom number: 18 | Shin-Nakamura Chemical Co., Ltd. (Wakayama-shi, Wakayama, Japan) |
| | LA | Lauryl acrylate Linear type, carbon atom number: 12 | Osaka Organic Chemical Industry Ltd. (Osaka-shi, Osaka, Japan) |
| | 2EHA | 2-ethylhexyl acrylate Branched type, carbon atom number: 8 | Nippon Shokubai Co., Ltd. (Osaka-shi, Osaka, Japan) |
| | BA | Butyl acrylate Linear type, carbon atom number: 4 | Mitsubishi Chemical Corporation (Chiyoda-ku, Tokyo, Japan) |
| | HCA-24 | 2-decyltetradecanyl acrylate Branched type, carbon atom number: 24 | Shin-Nakamura Chemical Co., Ltd. (Wakayama-shi, Wakayama, Japan) |
| | HCA-32 | 2-tetradecyl octadecyl acrylate Branched type, carbon atom number: 32 | — |
| | NDDA | 1,9-nonanediol diacrylate | Shin-Nakamura Chemical Co., Ltd. (Wakayama-shi, Wakayama, Japan) |
| | AEBP | 4-acryloyloxyethoxybenzophenone | 3M (St. Paul, MN, USA) |
| Polymerization initiator | V-601 | 2,2'-azobis(2-methylpropionic acid) dimethyl ester | Fujifilm Wako Pure Chemical Corporation (Osaka-shi, Osaka, Japan) |

TABLE 1-continued

| Type | Trade name, model No., or abbreviation | Description | Source of supply |
|---|---|---|---|
| Substrate | EMBLET (trade name) S-50 | Polyester film, thickness 50 μm | UNITIKA LTD, Osaka-shi, Osaka, Japan) |
| | COSMOSHINE (trade name) A4100 | Primer-treated polyester film, thickness 50 μm | Toyobo Co., Ltd. (Osaka-shi, Osaka, Japan) |
| | PCK (Poly-coated kraft) | Paper substrate with a basis weight of 107 $g/m^2$ coated on both sides with a mixture of HDPE/LDPE (70 mass %/30 mass %) of about 3 μm | Loparex, Inc. (NC, USA) |
| | Crisper(trade name) K 1212-100 | White polyester film, thickness: 100 μm | Toyobo Co., Ltd. (Osaka-shi, Osaka, Japan) |
| | Diafoil (trade name) W100-75 | White polyester film, thickness: 75 μm | Mitsubishi Chemical Corporation (Chiyoda-ku, Tokyo, Japan) |
| | Diafoil (trade name) W400-75 | White polyester film, thickness: 75 um | Mitsubishi Chemical Corporation (Chiyoda-ku, Tokyo, Japan) |
| | Lumirror (trade name) #75-E20 | White polyester film, thickness: 75 um | Toray Industries, Inc. (Chuo-ku, Tokyo, Japan) |
| Release liner | FD-75 | PET liner with fluorosilicone release layer | Lintec Corporation (Itabashi-ku, Tokyo, Japan) |
| Modified silicone | SPU33K | Silicone polyurea block copolymer, Mw 33K | 3M (St. Paul, MN, USA) |
| | SPO20K | Silicone polyoxamide block copolymer, Mw 20K | 3M (St. Paul, MN, USA) |
| MQ resin | XR37-B1795 | silicone-based tackifier | Momentive Performance Materials Japan (Chiyoda-ku, Tokyo, Japan) |

Precursor Polymer 1

These monomers were mixed so that the blended proportions of STA, ISA, and AEBP were 50.0 parts by mass, 50.0 parts by mass, and 0.2 parts by mass. The monomer mixture was diluted with ethyl acetate/n-heptane (50% by mass/50% by mass) mixed solvent so that the monomer concentration was 50% by mass. Furthermore, V-601 was added as an initiator in a proportion of 0.20 parts by mass based on the alkyl (meth)acrylate component, and the system was purged with nitrogen for 2 minutes. Thereafter, the reaction was allowed to proceed in a thermostatic bath at 65° C. for 48 hours to obtain a precursor polymer 1 of a viscous solution.

Precursor Polymers 2 to 12

The precursor polymers 2 to 12 were obtained in the same manner as in the above-described precursor polymer 1 except that the formulation was changed as shown in Table 2. Note that in the precursor polymer 10, the monomer mixture was diluted with an ethyl acetate solvent so that the monomer concentration was 40% by mass.

TABLE 2

| | STA | VA | ISA | LA | BA | 2EHA | HCA-24 | HCA-32 | NDDA | AEBP | V-601 | Solid content (mass %) |
|---|---|---|---|---|---|---|---|---|---|---|---|---|
| Precursor Polymer 1 | 50.0 | — | 50.0 | — | — | — | — | — | — | 0.20 | 0.20 | 50 |
| Precursor Polymer 2 | — | — | 75.0 | — | — | 25.0 | — | — | — | 0.20 | 0.10 | 50 |
| Precursor Polymer 3 | — | — | 67.5 | 32.5 | — | — | — | — | — | 0.25 | 0.10 | 65 |
| Precursor Polymer 4 | — | — | 65.0 | 35.0 | — | — | — | — | — | 0.25 | 0.10 | 65 |
| Precursor polymer 5 | — | — | 60.0 | 40.0 | — | — | — | — | — | 0.25 | 0.10 | 65 |
| Precursor Polymer 6 | — | — | 55.0 | 45.0 | — | — | — | — | — | 0.25 | 0.10 | 65 |
| Precursor Polymer 7 | — | — | 50.0 | 50.0 | — | — | — | — | — | 0.25 | 0.10 | 65 |
| Precursor Polymer 8 | — | — | — | — | — | — | 100 | — | 0.10 | 0.20 | 0.20 | 75 |
| Precursor Polymer 9 | — | — | — | — | — | — | — | 100 | 0.20 | 0.20 | 0.10 | 75 |
| Precursor Polymer 10 | 52.5 | — | — | — | 47.5 | — | — | — | — | — | 0.05 | 40 |
| Precursor Polymer 11 | 100 | — | — | — | — | — | — | — | — | 0.20 | 0.20 | 50 |
| Precursor polymer 12 | — | 100 | — | — | — | — | — | — | — | 0.20 | 0.20 | 55 |

Release Liner 1

The precursor polymer 1 was diluted to 1% by mass with a mixed solvent of toluene/MEK (50% by mass/50% by mass). This dilution was coated onto a polyester film (EMBLET (trade name) S-50) using a bar coater (#04). The solvent was then evaporated to form a release precursor layer having a thickness of about 0.1 micrometers.

A polyester film having a release precursor layer was irradiated with ultraviolet light in one pass at a line speed of 20 m/min using an ultraviolet irradiation device (F300, medium pressure mercury lamp (H bulb), Heraeus (Hanau, Hessen, Germany)) under a nitrogen gas atmosphere to cure the release precursor layer, thereby producing a release liner 1. At the time of irradiation, the amount of ultraviolet light per pass measured with a radiometer UV POWER PUCK (trade name) II available from EIT was 350 $mJ/cm^2$ (UVA 168 $mJ/cm^2$, UVB 158 $mJ/cm^2$, and UVC 24 $mJ/cm^2$).

Release Liners 2 to 12

Release liners 2 to 12 were obtained in the same manner as the release liner 1 described above except that the precursor polymers 2 to 12 in Table 2 were used in the release liners 2 to 12, respectively. Here, as for the precursor polymers 8 and 9, these precursor polymers were diluted to 1.06% by mass with a mixed solvent of toluene/MEK/n-heptane (34% by mass/33% by mass/33% by mass). In addition, as for the precursor polymer 12, this precursor polymer was diluted to 1.22% by mass with a single solvent of n-heptane.

Release Liners 13 and 14 (Release Liner of PCK Substrate)

As for release liners 13 and 14, the release liners 13 and 14 were obtained in the same manner as in the release liner 1 described above except that the precursor polymers 1 and 9 described above were respectively coated on PCK instead of the polyester film (EMBLET (trade name) S-50).

Release Liners 15 to 21 (Release Liner with White Film)

As for the release liner 15, the release liner 15 was obtained in the same manner as in the release liner 1 described above except that the precursor polymer 9 was coated on white polyester film Crisper (trade name) K1212-100 instead of the polyester film (EMBLET (trade name) S-50). As for the release liners 16 and 17, the release liner 16 and 17 were obtained in the same manner as in the release liner 15 except that the precursor polymer 9 was respectively diluted to 1.5% by mass and 2.0% by mass instead of 1.06% by mass. As for the release liner 18, the release liner 18 was obtained in the same manner as in the release liner 17 except that 2.0% by mass of the precursor polymer 1 instead of the precursor polymer 9 was coated on white polyester film (Crisper (trade name) K1212-100. As for the release liners 19 and 20, the release liners 19 and 20 were obtained in the same manner as in the release liner 18 except 2.0% by mass of the precursor polymer 1 was respectively coated on white polyester film DIAFOIL (trade name) W400-75 and Lumirror (trade name) #75-E20 instead of Crisper (trade name) K1212-100. As for the release liner 21, the release liner 21 was obtained in the same manner as in the release liner 18 except 1.0% by mass of the precursor polymer 1 instead of 2.0% by mass of the precursor polymer 1 was coated on white polyester film DIAFOIL (trade name) W100-75 instead of Crisper (trade name) K1212-100.

Preparation of Adhesive Tapes Using Produced Release Liner with silicone polyurea Block Copolymer-Based Adhesive The samples of the tapes to be evaluated used in the examples and comparative examples were prepared by the following two methods.

(1) Applying Adhesive Solution onto Produced Release Liner (Direct Application)

Firstly, 60 parts by mass of SPU 33K, 100 parts by mass of XR37-B1795, 180 parts of toluene and 60 parts of isopropyl alcohol were mixed to prepare an adhesive solution. Here, SPU 33K was prepared in the same manner described in the Example 28 of U.S. Pat. No. 6,569,521. The adhesive solution was coated on the produced release liner and dried at 105° C. for 10 minutes. The thickness of the dry adhesive layer was about 50 micrometers. An adhesive tape was obtained by applying FD-75 of a release liner on the adhesive layer.

(2) Applying Release Liner Produced on Adhesive Layer (Dry Laminate)

The adhesive solution described above was coated onto FD-75 of a release liner and dried at 105° C. for 10 minutes. The thickness of the dry adhesive layer was about 50 micrometers. The produced release liner was applied onto the adhesive layer to obtain an adhesive tape.

The produced adhesive tape was evaluated as follows, and the results are shown in Tables 3 to 6. Here, in the table, as for the release liner, for example, the release liner 1 is abbreviated as "liner 1". In addition, "NSNF-based" in the table means non-fluorine-based and non-silicone-based release liners prepared using an alkyl (meth)acrylate monomer having a linear alkyl group without using an alkyl (meth)acrylate monomer having a branched alkyl group, and "bNSNF-based" means non-fluorine-based and non-silicone-based release liners prepared using an alkyl (meth)acrylate monomer having a branched alkyl group.

Release Strength Test: Release Strength of Adhesive Layer to Release Layer of Produced Release Liner The FD-75 of the release liner was released from the adhesive tape, and a polyester film (COSMOSHINE (trade name) A 4100) was attached to the adhesive layer of the adhesive tape. Then, the polyester film and a SUS panel were bonded to each other with a double-sided tape interposed therebetween. Using a precision universal tester Autograph AG-X (Shimadzu Corporation (Kyoto-shi, Kyoto, Japan)), the release strength when the produced release liner was released in the 180 degree direction at a release speed of 300 mm/min was measured. Here, when the release strength exceeded 10 N/25 mm, it was described as ">10" in the table. Table 3 shows the test results of the adhesive tape prepared by direct coating, Table 4 shows the test results when the adhesive tape prepared by direct coating was aged under an environment of 50° C. and 80% RH for several weeks, and Table 5 shows the test results of the adhesive tape prepared by direct coating and the adhesive tape prepared by dry lamination.

Residual Adhesion Test

The polyester film with the adhesive layer remaining on the SUS panel after the test of release strength was released from the double-sided tape, and the adhesive layer exposed on the polyester film was attached to a SUS 304 (BA) panel. The adhesion when the polyester film was left standing at room temperature for 30 minutes and then released in the 180 degree direction at a release speed of 300 mm/min was measured as a residual adhesion using a precision universal tester Autograph AG-X (Shimadzu Corporation (Kyoto-shi, Kyoto, Japan)). Note that Table 6 also shows, as Reference Example 1, the residual adhesion of the adhesive tape prepared by the above-described direct applying method (1) using two fluorine-based release liners (FD-75).

TABLE 3

| direct application | | | | | | | | | | |
|---|---|---|---|---|---|---|---|---|---|---|
| | Example 1 | Example 2 | Example 3 | Example 4 | Example 5 | Example 6 | Example 7 | Example 8 | Example 9 | Comparative Example 1 |
| Release agent precursor | Precursor Polymer 1 | Precursor Polymer 2 | Precursor Polymer 3 | Precursor Polymer 4 | Precursor polymer 5 | Precursor Polymer 6 | Precursor Polymer 7 | Precursor Polymer 8 | Precursor Polymer 9 | Precursor Polymer 10 |
| Release liner | Liner 1 | Liner 2 | Liner 3 | Liner 4 | Liner 5 | Liner 6 | Liner 7 | Liner 8 | Liner 9 | Liner 10 |
| Type of release layer | b NSNF-based | b NSNF-based | b NSNF-based | b NSNF-based | b NSNF-based | b NSNF-based | b NSNF-based | b NSNF-based | b NSNF-based | NSNF-based |
| Release strength (N/25 mm) | 0.24 | 0.35 | 0.68 | 0.67 | 0.87 | 1.01 | 1.53 | 0.25 | 0.21 | >10 |

| | Comparative Example 2 | Comparative Example 3 | Example 10 | Example 11 | Example 12 | Example 13 | Example 14 |
|---|---|---|---|---|---|---|---|
| Release agent precursor | Precursor Polymer 11 | Precursor polymer 12 | Precursor Polymer 1 | Precursor Polymer 9 | Precursor Polymer 9 | Precursor Polymer 9 | Precursor Polymer 9 |
| Release liner | Liner 11 | Liner 12 | Liner 13 | Liner 14 | Liner 15 | Liner 16 | Liner 17 |
| Type of release layer | NSNF-based | NSNF-based | b NSNF-based | b NSNF-based | b NSNF-based | b NSNF-based | b NSNF-based |
| Release strength (N/25 mm) | >10 | >10 | 0.33 | 0.23 | 0.35 | 0.27 | 0.21 |

From the results in Table 3, it was found that the release layer of the non-fluorine-based and non-silicone-based bNSNF release liners of the present disclosure exhibited good releasing performance with respect to the silicone adhesive layer. In addition, for example, it was also checked that a release liner with light releasing and a release liner with heavy releasing was able to be separately produced by adjusting the polymer component.

TABLE 4

| Direct application (aged at 50° C., 80% RH) | | | | |
|---|---|---|---|---|
| | Example 15 | Example 16 | Example 17 | Example 18 |
| Release agent precursor | Precursor Polymer 1 | | | |
| Release liner | Liner 1 | | | |
| Aging time | Immediately after production | 2 weeks | 4 weeks | 6 weeks |
| Release strength (N/25 mm) | 0.21 | 0.15 | 0.24 | 0.17 |

From the results in Table 4, it was checked that the non-fluorine-based and non-silicone-based bNSNF release liners of the present disclosure had no influence on physical properties (release strength) even when subjected to an aging treatment, and were excellent in the moist heat-resistant stability of the release strength.

TABLE 5

| | Example 19 | Example 20 |
|---|---|---|
| Release agent precursor | Precursor Polymer 1 | |
| Adhesive layer forming method | Direct application | Dry laminate |
| Release strength (N/25 mm) | 0.24 | 0.21 |

From the results in Table 5, it was checked that the non-fluorine-based and non-silicone-based bNSNF release liners of the present disclosure had equivalent physical properties (release strength) by either the direct applying method or the dry lamination method.

TABLE 6

| Residual adhesion of direct application article | | | | | | | |
|---|---|---|---|---|---|---|---|
| | Example 21 | Example 22 | Example 23 | Example 24 | Example 25 | Example 26 | Example 27 |
| Release agent precursor | Precursor Polymer 1 | Precursor Polymer 2 | Precursor Polymer 3 | Precursor Polymer 4 | Precursor polymer 5 | Precursor Polymer 6 | Precursor Polymer 7 |
| Release liner | Liner 1 | Liner 2 | Liner 3 | Liner 4 | Liner 5 | Liner 6 | Liner 7 |
| Type of release layer | b NSNF-based | b NSNF-based | b NSNF-based | b NSNF-based | b NSNF-based | b NSNF-based | b NSNF-based |
| Residual adhesion | 11.9 | 12.1 | 11.2 | 11.9 | 11.8 | 15.0 | 11.8 |

TABLE 6-continued

Residual adhesion of direct application article (N/25 mm)

| | Example 28 | Example 29 | Example 30 | Example 31 | Example 32 | Reference Example 1 |
|---|---|---|---|---|---|---|
| Release agent precursor | Precursor Polymer 8 | Precursor Polymer 9 | Precursor Polymer 9 | Precursor Polymer 9 | Precursor Polymer 9 | — |
| Release liner | Liner 8 | Liner 9 | Liner 15 | Liner 16 | Liner 17 | FD-75 |
| Type of release layer | b NSNF-based | b NSNF-based | b NSNF-based | b NSNF-based | b NSNF-based | Fluorine-based |
| Residual adhesion (N/25 mm) | 12.1 | 12.2 | 12.9 | 12.2 | 13.0 | 11.0 |

From the results in Table 6, it was checked that the residual adhesion of the adhesive layer released from the non-fluorine-based and non-silicone-based bNSNF release liners of the present disclosure was equivalent to that of a fluorine-based release liner of Reference Example 1.

Preparation of Adhesive Tapes Using Produced Release Liner with Silicone Polyoxamide Block Copolymer-Based Adhesive For the release strength test and residual adhesion test, silicone polyoxamide block copolymer-based adhesive was used instead of silicone polyurea block copolymer-based adhesive. Firstly, 60 parts by mass of SPO 20K, 100 parts by mass of XR37-B1795 and 140 parts of ethyl acetate were mixed to prepare an adhesive solution. Here, SPO 20K was prepared in the same manner described in the Example 12 of U.S. Pat. No. 8,765,881. Then, the adhesive solution was coated on to FD-75 of a release liner and dried at 105° C. for 10 minutes. The thickness of the dry adhesive layer was about 50 micrometers. Finally, the produced release liner (liner 1, liner 18 to liner 21) was applied onto the adhesive layer to obtain an adhesive tape as dry laminate method.

The release strength test and residual adhesion test of the adhesive tape prepared with silicone polyoxamide block copolymer-based adhesive was evaluated in the same manner as the adhesive tape prepared with silicone polyurea block copolymer-based adhesive described above. Table 7 shows the test results of the release strength test and residual adhesion test.

TABLE 7

| | Example 33 | Example 34 | Example 35 | Example 36 | Example 37 |
|---|---|---|---|---|---|
| Release agent precursor | Precursor Polymer 1 | Precursor Polymer 1 | Precursor Polymer 1 | Precursor Polymer 1 | Precursor Polymer 1 |
| Release liner | Liner 1 | Liner 18 | Liner 19 | Liner 20 | Liner 21 |
| Type of release layer | b NSNF-based | b NSNF-based | b NSNF-based | b NSNF-based | b NSNF-based |
| Release strength (N/25 mm) | 0.25 | 0.23 | 0.26 | 0.27 | 0.23 |
| Residual adhesion (N/25 mm) | 15.8 | 16.0 | 15.4 | 15.0 | 15.1 |

Test Example 2

The heat-resistant stability of the release strength of the release liner against several silicone adhesive tapes was evaluated.

Table 8 shows various materials used. An adhesive tape using the produced release liner was prepared as follows, and the heat-resistant stability of the release liner was evaluated.

TABLE 8

| Type | Trade name, model No., or abbreviation | Description | Source of supply |
|---|---|---|---|
| Substrate | EMBLET (trade name) S-50 | Polyester film, thickness 50 μm | UNITIKA LTD, (Osaka-shi, Osaka, Japan) |
| | COSMOSHINE (trade name) A4100 | Primer-treated polyester film, thickness 50 μm | Toyobo Co., Ltd. (Osaka-shi, Osaka, Japan) |
| | PCK (Poly-coated kraft) | Paper substrate with a basis weight of 107 $g/m^2$ coated on both sides with a mixture of HDPE/LDPE (70% by mass/30% by mass) of about 3 μm | Loparex, Inc. (NC, USA) |

TABLE 8-continued

| Type | Trade name, model No., or abbreviation | Description | Source of supply |
|---|---|---|---|
| Release liner | FD-75 | PET liner with fluorosilicone release layer | Lintec Corporation (Itabashi-ku, Tokyo, Japan) |
| | K1 | PET liner with fluorosilicone release layer | FUJIKO Co. Ltd. (Marugame-shi, Kagawa, Japan) |
| | Cerapeel (trade name) PJ271 | PET liner with non-silicone resin | Toray Co., Ltd. (Chuo-ku, Tokyo, Japan) |
| Addition curable silicone adhesive | DOWSIL (trade name) BY-24-740 | Main agent | Dow Toray Co., Ltd. (Chuo-ku, Tokyo, Japan) |
| | DOWSIL (trade name) BY-24-741 | Crosslinking agent | Dow Toray Co., Ltd. (Chuo-ku, Tokyo, Japan) |
| | DOWSIL (trade name) SRX-212 | Curing catalyst for addition curing type (platinum catalyst) | Dow Toray Co., Ltd. (Chuo-ku, Tokyo, Japan) |
| Peroxide-curable silicone adhesive | DOWSIL (trade name) SH4280 | Main agent | Dow Toray Co., Ltd. (Chuo-ku, Tokyo, Japan) |
| | NIPER (trade name) BMT-K40 | Benzoyl peroxide solution | NOF CORPORATION (Shibuya-ku, Tokyo, Japan) |
| Silicone adhesive tape | 3M (trade name) Polyester Tape 8403 | Single-sided tape with silicone adhesive layer and polyester substrate | 3M Japan Limited (Shinagawa-ku, Tokyo, Japan) |
| | 3M (trade name) Heat resistant polyimide tape 5413 | Single-sided tape with silicone adhesive layer and polyimide substrate | 3M Japan Limited (Shinagawa-ku, Tokyo, Japan) |
| | 3M (trade name) Polyimide substrate silicone double-sided adhesive tape 4390 | Double-sided tape with silicone adhesive layer and polyimide substrate | 3M Japan Limited (Shinagawa-ku, Tokyo, Japan) |
| | Nitoflon (trade name) 903 UL | Single-sided tape with silicone adhesive layer and fluororesin substrate | Nitto Denko Corporation (Osaka-shi, Osaka, Japan) |

Examples 38 and 39 and Comparative Examples 4 to 6

100 parts by mass of DOWSIL (trade name) BY-24-740, 50 parts by mass of toluene, 1 part by mass of DOWSIL (trade name) BY-24-741, and 0.9 parts by mass of DOWSIL (trade name) SRX-212 were mixed to prepare an adhesive solution. The adhesive solution was coated onto a substrate (COSMOSHINE (trade name) A 4100) and dried at 65° C. for 5 minutes followed by drying at 120° C. for 3 minutes. The thickness of the dried adhesive layer was about 30 micrometers. Adhesive tapes of Examples 38 and 39 and Comparative Examples 4 to 6 were obtained by applying the respective release liners shown in Table 9 onto the adhesive layer.

Examples 40 and 41 and Comparative Examples 7 to 9

100 parts by mass of DOWSIL (trade name) SH 4280, 50 parts by mass of toluene, and 3 parts by mass of Niper (trade name) BMT-K40 were mixed to prepare an adhesive solution. The adhesive solution was coated onto a substrate (COSMOSHINE (trade name) A 4100) and dried at 65° C. for 5 minutes followed by drying at 130° C. for 10 minutes. The thickness of the dried adhesive layer was about 30 micrometers. Adhesive tapes of Examples 40 and 41 and Comparative Examples 7 to 9 were obtained by applying the respective release liners shown in Table 9 onto the adhesive layer.

Release Strength Test

The polyester film substrate (COSMOSHINE (trade name) A 4100) surface of each adhesive tape produced as described above was bonded to a SUS panel via a double-sided tape. Using a precision universal tester Autograph AG-X (Shimadzu Corporation (Kyoto-shi, Kyoto, Japan)), the release strength when the release liner was released in the 180 degree direction at a release speed of 300 mm/min was measured. The measurement results are shown in Table 9. Here, the release strength was measured using an adhesive tape after being left standing at room temperature (23±1° C., relative humidity 50±5%) for 24 hours and an adhesive tape after being left standing at 70° C. for 3 days.

TABLE 9

| | Example 38 | Example 39 | Comparative Example 4 | Comparative Example 5 | Comparative Example 6 | Example 40 | Example 41 | Comparative Example 7 | Comparative Example 8 | Comparative Example 9 |
|---|---|---|---|---|---|---|---|---|---|---|
| Types of adhesive layers | Addition curable silicone adhesive | | | | | Peroxide-curable silicone adhesive | | | | |
| Release liner | Liner 1 | Liner 9 | PJ271 | FD-75 | K1 | Liner 1 | Liner 9 | PJ271 | FD-75 | K1 |
| Type of release layer | b NSNF-based | b NSNF-based | Non-silicone based | Fluorine-based | Fluorine-based | b NSNF-based | b NSNF-based | Non-silicone based | Fluorine-based | Fluorine-based |
| Release strength after 24 hours at room temperature (N/25 mm) | 0.34 | 0.28 | 0.19 | 0.19 | 0.12 | 0.44 | 0.41 | 0.18 | 0.15 | 0.10 |
| Release strength after three days at 70° C. (N/25 mm) | 0.44 | 0.36 | 0.25 | 1.04 | 0.48 | 0.50 | 0.44 | 0.26 | 0.36 | 0.22 |

From the results in Table 9, in the adhesive tapes of Examples 38 and 39 and Examples 40 and 41, the release strength of the release liner was stable both after being left standing at room temperature and after being left standing at 70° C., and did not significantly change.

Examples 42 and 49 and Comparative Examples 10 to 21

Four commercially available silicone adhesive tapes, that is, 3M (trade name) polyimide substrate silicone double-sided adhesive tape 4390, 3M (trade name) polyester tape 8403, 3M (trade name) heat-resistant polyimide tape 5413, and Nitoflon (trade name) 903 UL, were used to evaluate the heat-resistant stability of the release liner.

For the 3M (trade name) polyimide substrate silicone double-sided adhesive tape 4390, first, one liner was released off, and a substrate (COSMOSHINE (trade name) A 4100) was applied onto the adhesive layer to obtain a single-sided adhesive tape. Next, this single-sided adhesive tape, and 3M (trade name) polyester tape 8403, 3M (trade name) heat-resistant polyimide tape 5413, and Nitoflon (trade name) 903 UL, which were also silicone single-sided adhesive tapes, were respectively applied onto the release liners shown in Tables 10 to 13 to obtain adhesive tapes of Examples 42 to 49 and Comparative Examples 10 to 21. Here, the application of the silicone adhesive to the release liner was performed by attaching the silicone adhesive surface to the release liner by reciprocating while pressing the silicone adhesive surface with a rubber roller having a self-weight of 5 kg, and leaving the laminate at room temperature (23±2° C., relative humidity 50±5%) for 24 hours.

The above-described release strength test performed in Example 38 was similarly performed on the adhesive tape, and the measurement results are shown in Tables 10 to 13. Here, the release strength was measured using an adhesive tape left standing at room temperature for 24 hours, an adhesive tape left standing at 100° C. for 12 hours, and an adhesive tape left standing at 120° C. for 1 hour.

TABLE 10

| | | Example 42 | Example 43 | Comparative Example 10 | Comparative Example 11 | Comparative Example 12 |
|---|---|---|---|---|---|---|
| Silicone adhesive tape | | 3M (trade name) Polyimide substrate silicone double-sided adhesive tape 4390 | | | | |
| Release liner | | Liner 1 | Liner 9 | PJ271 | FD-75 | K1 |
| Type of release layer | | b NSNF-based | b NSNF-based | Non-silicone based | Fluorine-based | Fluorine-based |
| Release strength (N/25 mm) | After 24 hours at room temperature | 1.50 | 1.28 | 0.88 | 0.16 | 0.10 |
| | After 12 hours at 100° C. | 1.38 | 1.20 | 1.80 | 0.48 | 0.21 |
| | After 1 hour at 120° C. | 1.16 | 1.08 | 10.1 | 0.28 | 0.14 |

TABLE 11

| | | Example 44 | Example 45 | Comparative Example 13 | Comparative Example 14 | Comparative Example 15 |
|---|---|---|---|---|---|---|
| Silicone adhesive tape | | 3M (trade name) Polyester Tape 8403 | | | | |
| Release liner | | Liner 1 | Liner 9 | PJ271 | FD-75 | K1 |
| Type of release layer | | b NSNF-based | b NSNF-based | Non-silicone based | Fluorine-based | Fluorine-based |
| Release strength (N/25 mm) | After 24 hours at room temperature | 0.32 | 0.28 | 0.17 | 0.04 | 0.04 |
| | After 12 hours at 100° C. | 0.27 | 0.25 | 0.28 | 0.15 | 0.08 |
| | After 1 hour at 120° C. | 0.29 | 0.28 | 3.54 | 0.07 | 0.04 |

TABLE 12

| | | Example 46 | Example 47 | Comparative Example 16 | Comparative Example 17 | Comparative Example 18 |
|---|---|---|---|---|---|---|
| Silicone adhesive tape | | 3M (trade name) Heat resistant polyimide tape 5413 | | | | |
| Release liner | | Liner 1 | Liner 9 | PJ271 | FD-75 | K1 |
| Type of release layer | | b NSNF-based | b NSNF-based | Non-silicone based | Fluorine-based | Fluorine-based |
| Release strength (N/25 mm) | After 24 hours at room temperature | 0.66 | 0.60 | 0.46 | 0.07 | 0.05 |
| | After 12 hours at 100° C. | 0.74 | 0.58 | 0.78 | 0.72 | 0.10 |
| | After 1 hour at 120° C. | 0.62 | 0.54 | 5.26 | 0.14 | 0.06 |

TABLE 13

| | | Example 48 | Example 49 | Comparative Example 19 | Comparative Example 20 | Comparative Example 21 |
|---|---|---|---|---|---|---|
| Silicone adhesive tape | | Nitoflon (trade name) 903 UL | | | | |
| Release liner | | Liner 1 | Liner 9 | PJ271 | FD-75 | K1 |
| Type of release layer | | b NSNF-based | b NSNF-based | Non-silicone based | Fluorine-based | Fluorine-based |
| Release strength (N/25 mm) | After 24 hours at room temperature | 1.65 | 1.28 | 0.88 | 0.12 | 0.07 |
| | After 12 hours at 100° C. | 1.82 | 1.50 | 2.40 | 3.25 | 2.10 |
| | After 1 hour at 120° C. | 1.90 | 1.68 | 8.90 | 2.30 | 0.68 |

From the results in Tables 10 to 13, the adhesive tapes of Examples 42 to 49 had very high heat-resistant stability. On the other hand, all of the commercially available release liners shown as comparative examples resulted in a heavy release force depending on the environment.

Examples 50 to 57

As in Examples 42 to 49, four commercially available silicone adhesive tapes were used to evaluate the heat-resistant stability of the release liners 13 and 14. In the same manner as in Examples 42 to 49, the release liners 13 and 14 were applied to the silicone adhesive surface of each of commercially available silicone adhesive tapes shown in Tables 13 to 16 to obtain an adhesive tape of Examples 50 to 57.

The above-described release strength test performed in Example 38 was similarly performed on the adhesive tape, and the measurement results are shown in Tables 14 to 17. Here, the release strength was measured using an adhesive tape left standing at room temperature for 24 hours and an adhesive tape left standing at 70° C. for 3 days.

TABLE 14

| | | Example 50 | Example 51 |
|---|---|---|---|
| Silicone adhesive tape | | 3M (trade name) Polyimide substrate silicone double-sided adhesive tape 4390 | |
| Release liner | | Liner 13 | Liner 14 |
| Type of release layer | | b NSNF-based | b NSNF-based |
| Release strength (N/25 mm) | After 24 hours at room temperature | 1.26 | 1.16 |
| | After 3 days at 70° C. | 1.44 | 1.18 |

TABLE 15

| | | Example 52 | Example 53 |
|---|---|---|---|
| Silicone adhesive tape | | 3M (trade name) Heat resistant polyimide tape 8403 | |
| Release liner | | Liner 13 | Liner 14 |
| Type of release layer | | b NSNF-based | b NSNF-based |
| Release strength (N/25 mm) | After 24 hours at room temperature | 0.27 | 0.21 |
| | After 3 days at 70° C. | 0.25 | 0.21 |

TABLE 16

| | | Example 54 | Example 55 |
|---|---|---|---|
| Silicone adhesive tape | | 3M (trade name) Heat resistant polyimide tape 5413 | |
| Release liner | | Liner 13 | Liner 14 |
| Type of release layer | | b NSNF-based | b NSNF-based |
| Release strength (N/25 mm) | After 24 hours at room temperature | 0.60 | 0.56 |
| | After 3 days at 70° C. | 0.62 | 0.54 |

TABLE 17

| | | Example 56 | Example 57 |
|---|---|---|---|
| Silicone adhesive tape | | Nitoflon (trade name) 903 UL | |
| Release liner | | Liner 13 | Liner 14 |
| Type of release layer | | b NSNF-based | b NSNF-based |
| Release strength (N/25 mm) | After 24 hours at room temperature | 1.15 | 1.10 |
| | After 3 days at 70° C. | 1.38 | 1.32 |

From the results of Tables 14 to 17, the adhesive tape of Examples 50 to 57 had a stable release force even in a case of the PCK substrate, and had a stable release force even at a high temperature.

It is apparent to those skilled in the art that various modifications can be made to the above embodiments and examples without departing from the basic principle of the present invention. In addition, it will be apparent to those skilled in the art that various improvements and modifications of the present invention can be carried out without departing from the spirit and the scope of the present invention.

REFERENCE SIGNS LIST

100 Laminate
101 Release liner (first release liner)
103 Silicone adhesive layer
105 Second release liner
200 Roll body
201 Release liner
203 Silicone adhesive layer

What is claimed is:

1. A laminate comprising:
a release liner for a silicone adhesive layer comprising:
a substrate; and
a release layer on at least one surface of the substrate,
wherein the release layer contains poly(meth)acrylic acid ester, and the poly(meth)acrylic acid ester is a polymer of a polymerizable component including an alkyl (meth)acrylate monomer having a branched alkyl group having 8 or more carbon atoms; and
a silicone adhesive layer disposed on the release layer of the release liner.

2. The laminate according to claim 1,
wherein the polymerizable component contains 40% by mass or greater of an alkyl (meth)acrylate monomer having the branched alkyl group having 8 or more carbon atoms with respect to a total amount of an alkyl (meth)acrylate monomer component.

3. The laminate according to claim 1,
wherein the polymerizable component contains an alkyl (meth)acrylate monomer having a linear alkyl group.

4. The laminate according to claim 1,
wherein the polymerizable component contains a (meth) acrylate monomer having a radiation active group in a side chain.

5. The laminate according to claim 1,
wherein the substrate contains a paper.

6. The laminate according to claim 1,
wherein the substrate contains a white film.

7. The laminate according to claim 1,
wherein a release strength of the silicone adhesive layer with respect to the release layer of the release liner is 10 N/25 mm or less.

8. A roll body comprising:
a release liner for a silicone adhesive layer comprising:
a substrate; and
a release layer on at least one surface of the substrate,
wherein the release layer contains poly(meth)acrylic acid ester, and the poly(meth)acrylic acid ester is a polymer of a polymerizable component including an alkyl (meth)acrylate monomer having a branched alkyl group having 8 or more carbon atoms, and wherein the release liner include es a release layer on both sides; and
a silicone adhesive layer.

9. The laminate according to claim 1, or the roll body according to claim 8, used as a single-sided tape, double-sided tape, or an adhesive transfer tape.

10. A laminate comprising, in this order:
a release liner for a silicone adhesive layer comprising:
a substrate; and
a release layer on at least one surface of the substrate,
wherein the release layer contains poly(meth)acrylic acid ester, and the poly(meth)acrylic acid ester is a polymer of a polymerizable component including an alkyl (meth)acrylate monomer having a branched alkyl group having 8 or more carbon atoms;
a silicone adhesive layer; and
a second release liner.

* * * * *